(12) United States Patent
Kojima et al.

(10) Patent No.: US 7,784,367 B2
(45) Date of Patent: Aug. 31, 2010

(54) METHOD OF GAS RESISTANCE TEST FOR IMAGE AND INK SET

(75) Inventors: Yojiro Kojima, Tokyo (JP); Hiroyuki Ogino, Yokohama (JP); Takayuki Ishikawa, Inba-gun (JP); Takao Yamamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 548 days.

(21) Appl. No.: 11/577,884

(22) PCT Filed: May 31, 2005

(86) PCT No.: PCT/JP2005/010312

§ 371 (c)(1),
(2), (4) Date: Apr. 25, 2007

(87) PCT Pub. No.: WO2006/059407

PCT Pub. Date: Jun. 8, 2006

(65) Prior Publication Data

US 2008/0156070 A1    Jul. 3, 2008

(30) Foreign Application Priority Data

Dec. 1, 2004    (JP) .............................. 2004-349181

(51) Int. Cl.
*G01N 17/00*    (2006.01)
(52) U.S. Cl. .................... 73/865.6; 347/100; 106/31.13
(58) Field of Classification Search ................ 73/159, 73/865.6; 106/31.13; 118/75; 347/100; 427/8
See application file for complete search history.

(56) References Cited

U.S. PATENT DOCUMENTS

| | | | | |
|---|---|---|---|---|
| 3,375,115 | A | * | 3/1968 | Smith et al. .................. 430/428 |
| 4,618,537 | A | * | 10/1986 | Takano et al. ............... 428/336 |
| 7,008,671 | B2 | | 3/2006 | Ishikawa et al. |
| 7,011,699 | B2 | * | 3/2006 | Yamanouchi et al. .... 106/31.13 |
| 7,303,616 | B2 | * | 12/2007 | Oki et al. ................. 347/100 X |
| 7,500,743 | B2 | * | 3/2009 | Takashima .................. 347/100 |
| 2003/0005945 | A1 | * | 1/2003 | Onishi et al. .................... 134/3 |

(Continued)

FOREIGN PATENT DOCUMENTS

EP    1 418 416 A1    5/2004

(Continued)

OTHER PUBLICATIONS

Hiroyuki Ogino et al., "A Study of Digital Photo Image Permanency 2," Japan Hardcopy 2004 Papers, pp. 77-80, Jun. 2004, in Japanese with English abstract.

(Continued)

*Primary Examiner*—Thomas P Noland
(74) *Attorney, Agent, or Firm*—Fitzpatrick, Cella, Harper & Scinto

(57) ABSTRACT

Gas resistance of an image is evaluated by placing the image in a mixed gas atmosphere containing at least ozone and nitrogen dioxide. The mixed gas atmosphere is controlled such that the concentrations of ozone and nitrogen dioxide are not less than 75 ppb and not less than 150 ppb, respectively, and the mixed gas is continuously supplied to the surface of a sample bearing the image at a flow rate not less than 0.2 m/s and not more than 3.0 m/s.

9 Claims, 16 Drawing Sheets

U.S. PATENT DOCUMENTS

2004/0141036 A1 7/2004 Ishikawa
2005/0191446 A1 9/2005 Ishikawa et al.

FOREIGN PATENT DOCUMENTS

| JP | 07329426 A | * | 12/1995 |
|---|---|---|---|
| JP | 2002088279 A | * | 3/2002 |
| JP | 2003-118228 A | | 4/2003 |
| JP | 2004075759 A | * | 3/2004 |
| JP | 2004-170403 A | | 6/2004 |
| WO | WO 02083795 A2 | * | 10/2002 |
| WO | WO 2005030885 A1 | * | 4/2005 |

OTHER PUBLICATIONS

Yojiro Kojima et al., "Study on Gas Fastness of Ink Jet Prints," IS&T's NIP20: 2004 International Conference on Digital Printing Technologies, pp. 724-728, Oct. 2004.

* cited by examiner

US 7,784,367 B2

METHOD OF GAS RESISTANCE TEST FOR IMAGE AND INK SET

TECHNICAL FIELD

The present invention relates to a method of gas resistance test for an image and an ink set having excellent gas resistance designed based on the test method and, more particularly, to a gas resistance test method that can estimate gas resistance of an image such as an ink-jet image and silver halide photo image sensitive to the environmental gas in a correlated manner with the gas resistance of the image in the real environment.

BACKGROUND ART

In recent years, along with performance improvement, an ink-jet printer has been used in various fields. A photo print is one of them, and its speed and high image quality have reached a level comparable to a conventional silver halide photo. On the other hand, there is a problem of image fastness left in the field of the ink-jet as well as that of the silver halide photo, wherein a color fading in the image occurs during preservation of the image due to environmental factors existing in nature (for example, gas, light, heat, water, and the like).

Currently, discussion exists over the fastness evaluation standard of a digital photo image including the ink-jet image in ISO (International Organization for Standardization) for the purpose of estimating the image fastness. The subject of the discussion includes new standards of, water resistance, moisture resistance, gas resistance, heat resistance (dark place preservation), room light resistance, outdoor weather resistance, and End Point. Among them, an ozone test is taken up as an evaluation method for the gas resistance, and many reports about the ozone test have been made. However, various gas types exist in the real environment, in addition to ozone. Although there is a fear of the influence of these gas types on the gas resistance of the image, there are not many tests performed in combination of the gas types in the real environment other than ozone.

As the test performed in combination of the gas types in the real environment other than ozone, for example, an image weather resistance test method has been disclosed (Japanese Patent Application Laid-Open No. 2004-170403). This method is featured by comprising a step of setting an image in a mixed gas atmosphere, the mixed gas containing ozone and at least one kind of gas other than ozone and another step of irradiating a predetermined amount of light having a predetermined wavelength on the image in the mixed gas atmosphere.

Further, there is a disclosure about a recorded matter having a nonvolatile liquid portion that does not dissolve a color material such as silicone oil (Japanese Patent Application Laid-Open No. 2003-118228) In this disclosure, a gas resistance test using the mixed gas has been performed.

As described above, the ozone test has mainly been performed as an evaluation test method of the gas resistance. However, various gas types exist in the real environment, in addition to ozone, so that it was not necessarily possible to accurately simulate an image degradation degree in the real environment with the ozone test. Further, improvement in the weather resistance of the ink-jet photo image of recent years makes it difficult to perform a real environmental test in terms of development schedule. Thus, the importance of a simulation technique as a means for verifying the gas resistance is increasingly growing.

Further, the gas resistance evaluation method using the mixed gas also cannot accurately simulate an image degradation degree in room environment where the ink-jet image, silver halide photo image, and the like are mainly preserved. Thus, there has been a need of proposing a simple gas resistance evaluation test method for image that can accurately simulate the degree of image degradation in room environment.

The above-mentioned invention disclosed in Japanese Patent Application Laid-Open No. 2004-17043 sees about not only the influence of gas, but also the influence of light. However, an image is not always preserved in the light but may be preserved in a dark place such as a closet or a dark room in some cases. In such cases, there is no need to take the influence of light into consideration. Further, the apparatus used in that invention is very expensive, so that a simple gas resistance evaluation test method for image has been demanded.

The gas resistance test disclosed in Japanese Patent Application Laid-Open No. 2003-118228 is not an evaluation method for a color material, but for silicone oil. Therefore, the test condition disclosed is not related to the evaluation method that the present invention intends to provide at all, and it is impossible to find out the gas resistance test method for image that accurately simulated the degree of image degradation in room environment. Therefore, the simple gas resistance evaluation test method for image that can accurately simulate the degree of image degradation in room environment has still been demanded.

Further, in conventional gas resistance tests, including the above patent document, a constant amount of gas is allowed to flow in a tank. However, the examination by the present inventors reveals that gas concentration on the surface of the image sample to be examined in the present invention varies from part to part even within the single tank, so that a gap between the result of this test and that of the real environmental test may be caused. This problem needs to be solved.

DISCLOSURE OF THE INVENTION

An object of the present invention is, therefore, to provide a gas resistance test method capable of accurately and simply simulating the gas resistance of the ink-jet image, silver halide photo image and the like under real environment and an ink set having excellent gas resistance which has been designed using the gas resistance test method.

To solve the above problem, the present inventors focused on the image degradation caused in real environment, in particular, in room environment where an ink-jet image or silver halide photo image would be often preserved and undertook development of a test method capable of accurately simulating the image degradation. The present invertors firstly selected gas concentration and temperature/humidity from environment factors in general environment; continuously measured these values at various measurement points and the image degradation caused in the images placed at the measurement points; and examined the environment factors and image degradation in a correlated manner to grasp the image degradation in real environment. Further, based on the result obtained by the above examination, accelerating test conditions in gas resistance test for image capable of accurately and equitably dealing with the image degradation caused in various digital images placed in real environment and simply and easily evaluating the gas resistance of the image has been developed. More concretely, the global average value of general room environmental factors is calculated based on room environmental factors in various regions in Japan and outdoor environmental factors in Japan and the rest of the world, and accelerating test condition which is regarded as a potential global standard and capable of accurately and equitably dealing with the image degradation for a variety of digital images caused in real environment is to be established based on the calculation and proposed.

The present invention uses mixed gas containing ozone and nitrogen dioxide by a specific amount or more and supplies the mixed gas to the surface of an image sample at a flow rate within a certain range. With this configuration, the image sample is placed in an acidic atmosphere containing oxidative gas (nitric acid, etc.) generated by a specific coexistence state between ozone and nitrogen dioxide, and the portion around the surface of the image sample is filled with evenly mixed gas in such state. Therefore, it can be said that accelerating test condition of the image degradation exhibiting strong correlation with the image degradation in real environment has been obtained. Further, as a result of the extensive studies, the present inventors found that setting the ratio of nitrogen dioxide in the mixed gas sufficiently higher than that of ozone allows the concentration of the oxidative gas (nitric acid, etc.) generated by a specific coexistence state between ozone and nitrogen dioxide to be set in a suitable amount, and that thereby it is possible to make acidic atmosphere capable of generating, at short times, image degradation accurately corresponding to (correlating with) the image degradation caused in real room environment where an ink-jet image or the like is often preserved, thereby achieving the present invention.

As described above, the present invention uses the mixed gas containing a specific amount of ozone and nitrogen dioxide and supplies the mixed gas to the surface of the image sample at a flow rate within a certain range to generate oxidative gas such as nitric acid. Further, the oxidative gas such as nitric acid existing at the portion near the surface of the image sample is maintained at an adequate amount. With the above configuration, it is possible to cause, at short times, image degradation of the same level as that caused in real environment. Therefore, the configuration and technical concept of the present invention entirely differ from those of the abovementioned invention disclosed in Japanese Patent Application Laid-Open No. 2004-170403 that includes a means of setting an image in an atmosphere of mixed gas containing ozone and at least one kind of gas other than ozone.

The concrete configuration of the present invention is:

a gas resistance test method for image which sets an image in a mixed gas atmosphere containing at least ozone and nitrogen dioxide and evaluates the gas resistance of the image, characterized in that the image is set in the mixed gas atmosphere under the conditions (1) and (2):

(1) the ozone concentration in the mixed gas is not less than 75 ppb and the nitrogen dioxide concentration in the mixed gas is not less than 150 ppb; and (2) the mixed gas is continuously supplied to the sample surface at a flow rate not less than 0.2 m/s and not more than 3.0 m/s.

Another embodiment of the present invention is:

a gas resistance test method for image which sets an image in a mixed gas atmosphere containing at least ozone and nitrogen dioxide and evaluates the gas resistance of the image, characterized in that the image is set in the mixed gas atmosphere under the conditions (1) and (2):

(1) the ozone concentration in the mixed gas is not less than 75 ppb and the nitrogen dioxide concentration in the mixed gas is not less than 150 ppb; and (2) the mixed gas is continuously supplied to the sample surface at flow a rate that does not generate concentration gradient on the sample surface.

Still another embodiment of the present invention is:

an ink set for ink-jet printing including a combination of a plurality of inks, characterized in that when the images formed of respective inks are subjected to the gas resistance test for 360 hours in succession under the following conditions (1) and (2), differences between the image concentration (or optical density "OD") survival rates of all inks fall below 1%:

(1) the ozone concentration in the mixed gas is not less than 75 ppb and the nitrogen dioxide concentration in the mixed gas is not less than 15 ppb; and (2) the mixed gas is continuously supplied to the sample surface at a flow rate not less than 0.2 m/s and not more than 3.0 m/s.

According to the present invention, there is provided a gas resistance test method capable of accurately and simply simulating the gas resistance of the ink-jet recoded image and silver halide photo image in an correlated manner with the image degradation caused in the image preserved in real environment. Further, the above test method is used to design inks and combine them to obtain an ink set exhibiting sufficient gas resistance properties when the image formed by the ink set is preserved in real environment.

BEST MODE FOR CARRYING OUT THE INVENTION

Figure 1:
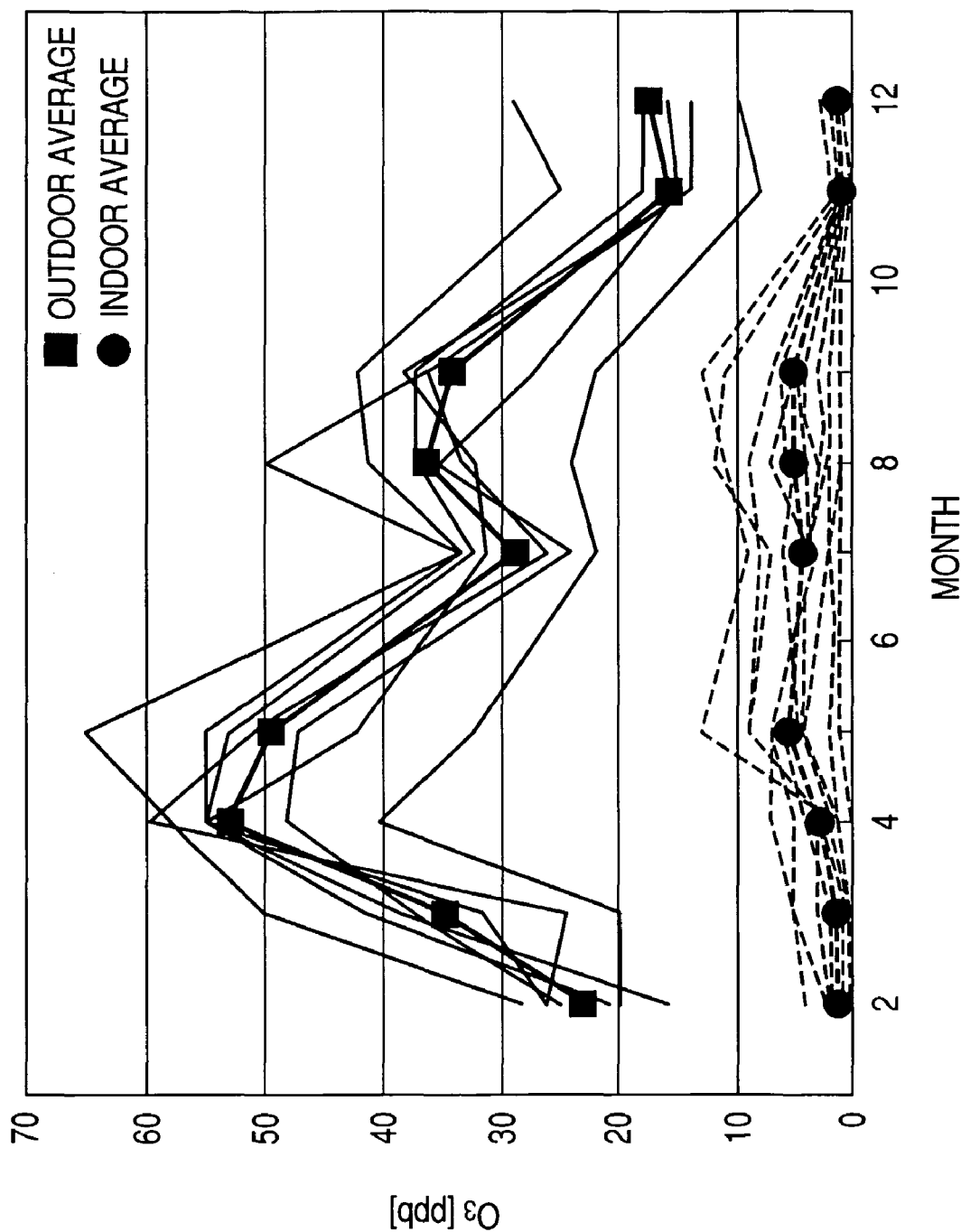
FIG. 1 is a graph showing the ozone concentration in indoor and outdoor environment throughout the year.

A preferred embodiment of the present invention will be described below in detail.

(Analysis of Real Room Environment and Degradation of Image Preserved in Real Room Environment)

<Experimental Method>

As shown in Table 1, measurements of respective environmental factors in a plurality of locations in homes and offices and image degradation caused in respective images located in the above locations were continuously performed from February 2003 to January 2004. In the measurement of the image degradation, a procedure of: collection of the images to be measured→measurement→relocation is performed one time per month in principle. As the measurement location, 4 homes in the Kanto region and 3 business establishments of Canon Inc. were selected. Gas and temperature/humidity were measured at the respective locations indicated by o in Table 1, and image samples were placed at the respective locations indicated by o. As the image sample, an ink-jet image and silver halide photo image were used. More concretely, as the ink-jet image, a color image printed on PR101 using a Canon PIXUS F900 six-color printer was used.

TABLE 1

Location where measurement was performed and images were placed and measured environmental factors

| Test location | Measurement location | Measured environment factor | | Placement of image sample |
|---|---|---|---|---|
| | | Gas | Temp/Humid | |
| Home | Home A | Outdoor | o | | o |
| | | Living (a, b) | o | o | o |
| | | Room a | o | | o |
| | | Room b | o | | o |
| | Home B | Outdoor | o | | o |
| | | Living (a, b) | o | o | o |
| | | Restroom | o | | o |
| | | Corridor | o | | o |
| | Home C | Outdoor | o | | o |
| | | Living (a, b) | o | o | o |
| | | Front door | o | | o |
| | | Room | o | | o |
| | Home D | Outdoor | o | o | o |
| | | Room (a, b) | o | o | o |
| | | Entrance | o | o | o |
| | | Hall | o | o | o |
| Office | Office A | Outdoor | o | o | o |
| | | Room (a, b) | o | o | o |
| | | Passage (a, b) | o | o | o |
| | | Room c | o | o | o |
| | | Room d | o | o | o |
| | Office B | Outdoor | o | | o |
| | | Room (a, b) | o | o | o |
| | Office C | Outdoor | o | o | o |
| | | Room (a, b) | o | o | o |

<Measurement of Gas Concentration>

The gas concentrations of ozone ($O_3$), nitrogen dioxide ($NO_2$), and sulfur dioxide ($SO_2$) were measured at the respective locations at homes and offices shown in Table 1. Here, a simple environmental measurement method using a passive sampler was employed to evaluate the average concentration. The reason for selecting the above three gases as the gas representing the environmental factors is as follows:

[1] It is expected that a large amount is contained in real environment.

[2] Related data is abundant in public institutions.

[3] Measurement and analysis are easy to be performed.

<Measurement of Temperature/Humidity>

A thermohygrometer Datalogger (manufactured by SATO KEIRYOKI MFG. CO. Ltd.) was used to measure temperature/humidity at the respective locations at homes and offices shown in Table 1. The used thermohygrometer can automatically record the measurement results. With the thermohygrometer, temperature [° C.] and relative humidity [%] were measured every one hour.

<Measurement of Image Degradation>

Image samples of the ink-jet image and silver halide photo image having the same image as each other were prepared and placed at the respective locations shown in Table 1. The image samples were collected once each month. At the collection time, Spectrolino (manufactured by GretagMacbeth company) is used to measure the optical density (OD) as the image concentration, thereby performing long-term observations of the degree of image degradation caused with time.

<Multiple Linear Regression Analysis>

In order to statistically analyze the overall relationship between the environmental measurement data and image degradation data obtained as described above, a multiple linear regression analysis, which is a kind of multiple classification analysis, was used. The multiple linear regression analysis was applied to $O_3$ concentration, $NO_2$ concentration, $SO_2$ concentration, and humidity (/temperature) with respect to the optical density of each image to examine how/which factor affects the image fastness. SPSS ver 11.5J for Windows (manufactured by SPSS CO. Ltd.), which is statistical analysis software, is used for the calculation.

(Result)

<Measurement Result of Gas Concentration>

Figure 2:
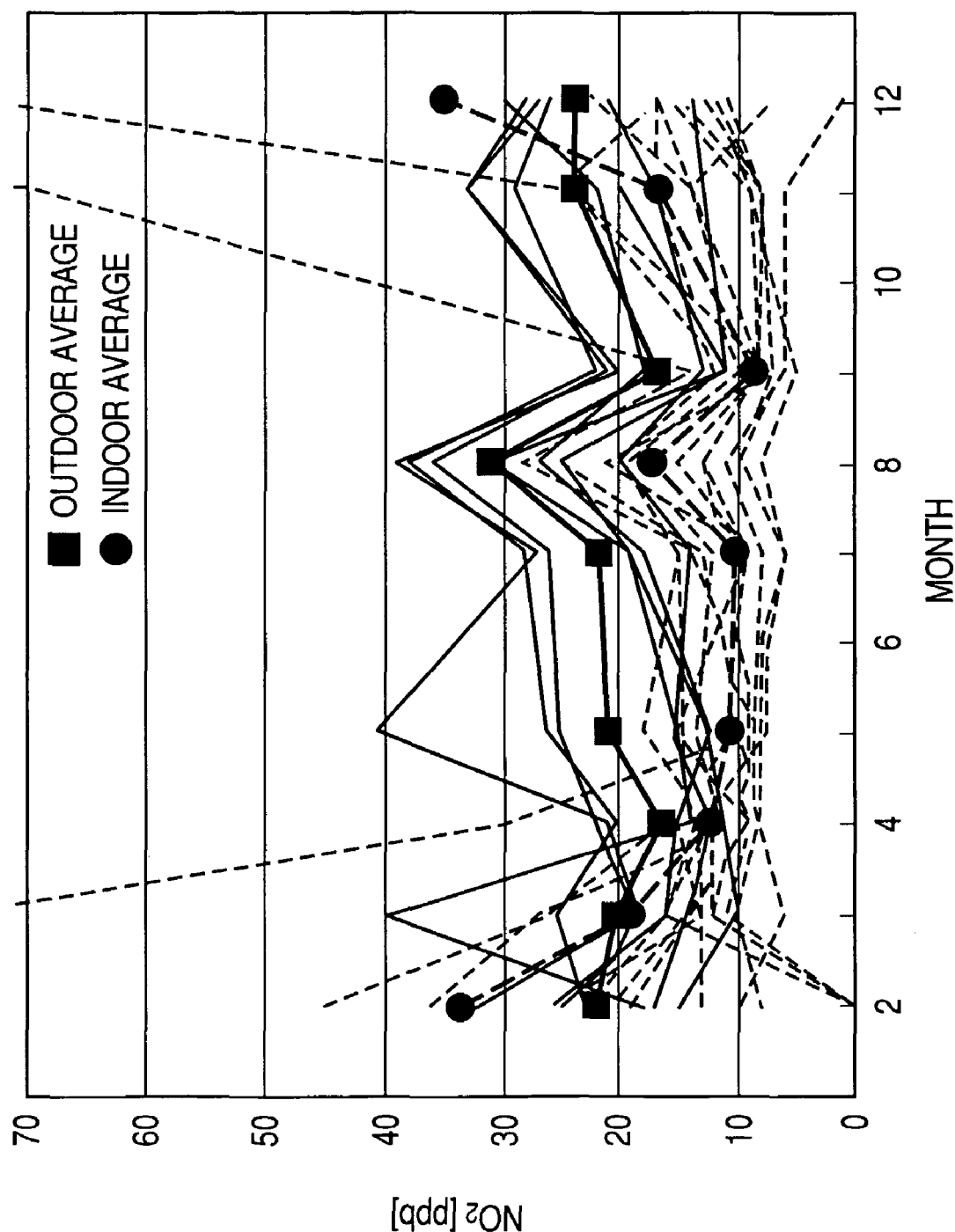
FIG. 2 is a graph showing the nitrogen dioxide concentration in indoor and outdoor environment throughout the year.
Figure 3:
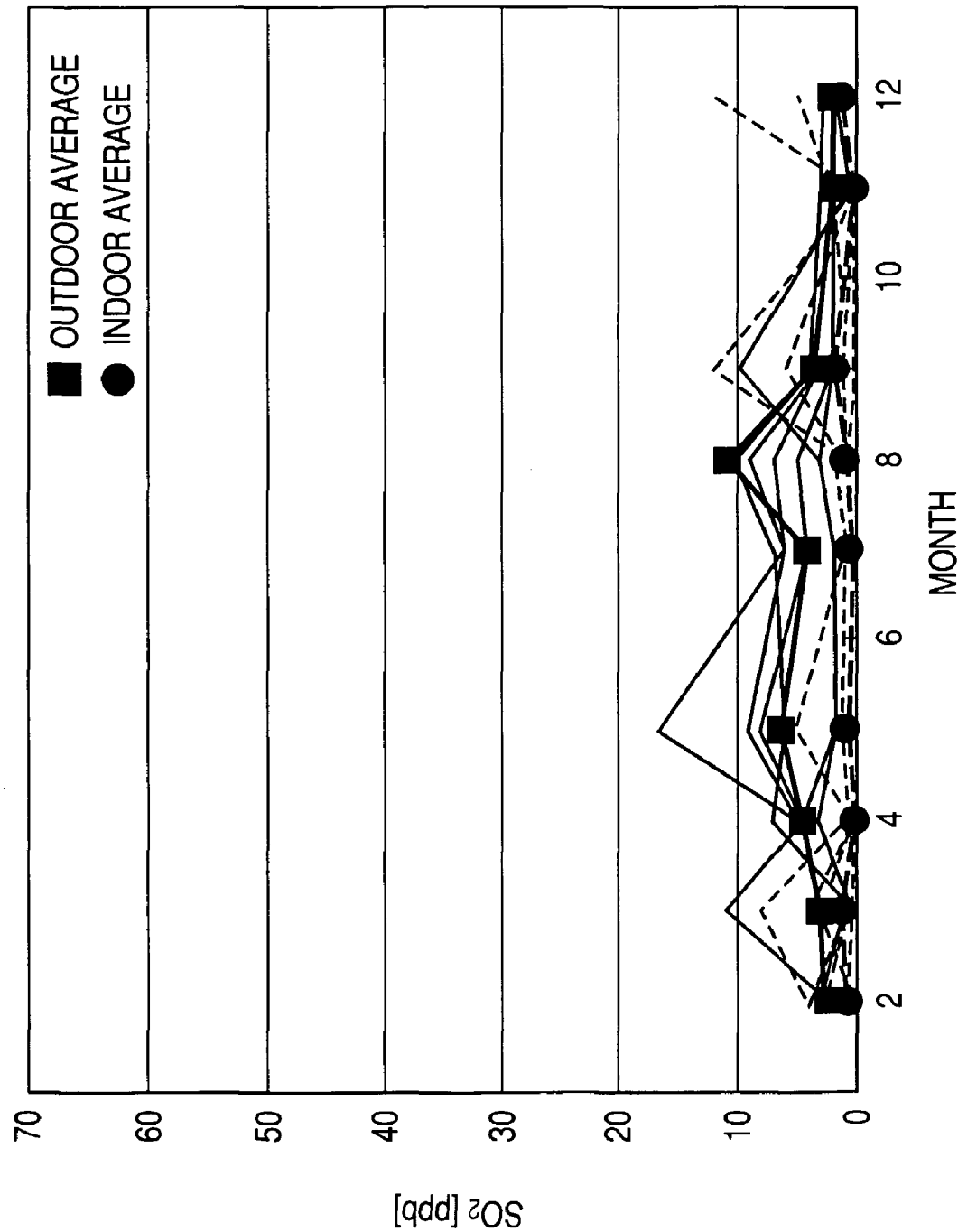
FIG. 3 is a graph showing the sulfur dioxide concentration in indoor and outdoor environment throughout the year.

As can be seen from FIG. 1, $O_3$ concentration, both indoor and outdoor, tends to increase from spring to autumn. Further, as shown in FIGS. 1 to 3, indoor $O_3$ concentration is significantly reduced as compared to outdoor $O_3$ concentration (about ⅒); whereas, with regard to $NO_2$ and $SO_2$, there is a little difference between indoor and outdoor environment. The ratio of indoor environment gas concentration average throughout the year is:

$O_3$:$NO_2$:$SO_2$=3 ppb:19 ppb:1 ppb (in FIGS. 1 to 3, dotted line denotes indoor data and solid line denotes outdoor data, ● denotes indoor average, and ■ denotes outdoor average). In estimating the image degradation, that is, the life of the image, a setting of assumed environment of the room in which the image sample is to be placed is important. The present invention has another significance of realizing the assumed environment as $O_3$:$NO_2$:$SO_2$=3 ppb:19 ppb:1 ppb.

In the present invention, the mixed gas test was performed in the condition $O_3$:$NO_2$:$SO_2$=3 ppb:18 ppb:1 ppb. In the mixed gas test corresponding to five years of real environment, there is a little difference between the conditions $O_3$:$NO_2$:$SO_2$=3 ppb:19 ppb:1 ppb and $O_3$:$NO_2$ $SO_2$=3 ppb:18 ppb:1 ppb. However, in the mixed gas test corresponding to ten years or more of real environment, which requires higher accuracy, it is preferable to perform the mixed gas test with the condition, which is the actual measurement value of higher accuracy, set to the ratio $O_3$:$NO_2$:$SO_2$=3 ppb:19 ppb:1 ppb.

<Measurement Result of Temperature/Humidity>

Figure 4:
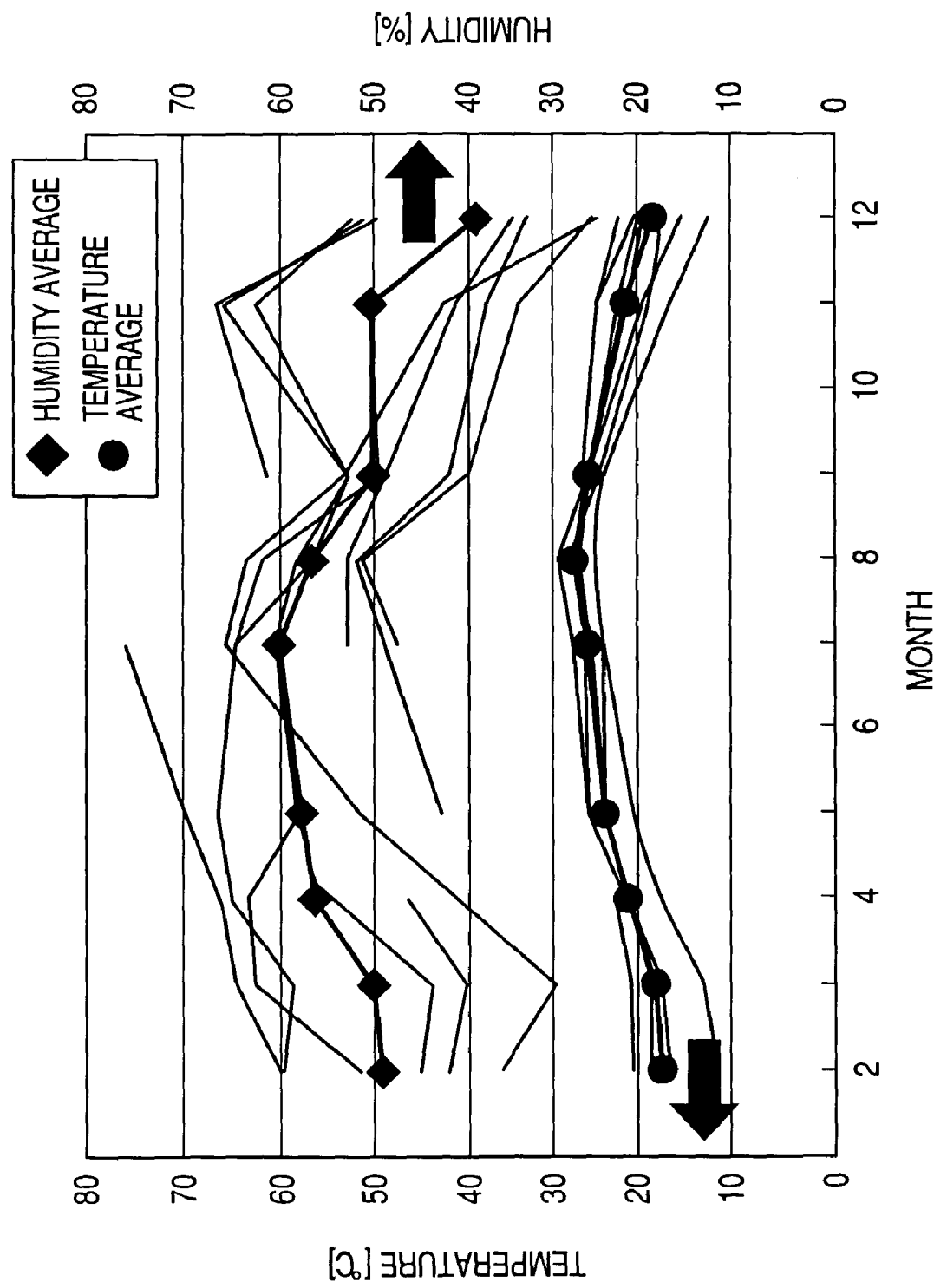
FIG. 4 is a graph showing temperature and humidity in indoor and outdoor environment throughout the year.

The measurement result of the indoor temperature and humidity is as shown in FIG. 4. Both of the temperature and humidity tend to increase in summer and decrease in winter.

<Result of Long-Term Measurement of Image Degradation>

Figure 5:
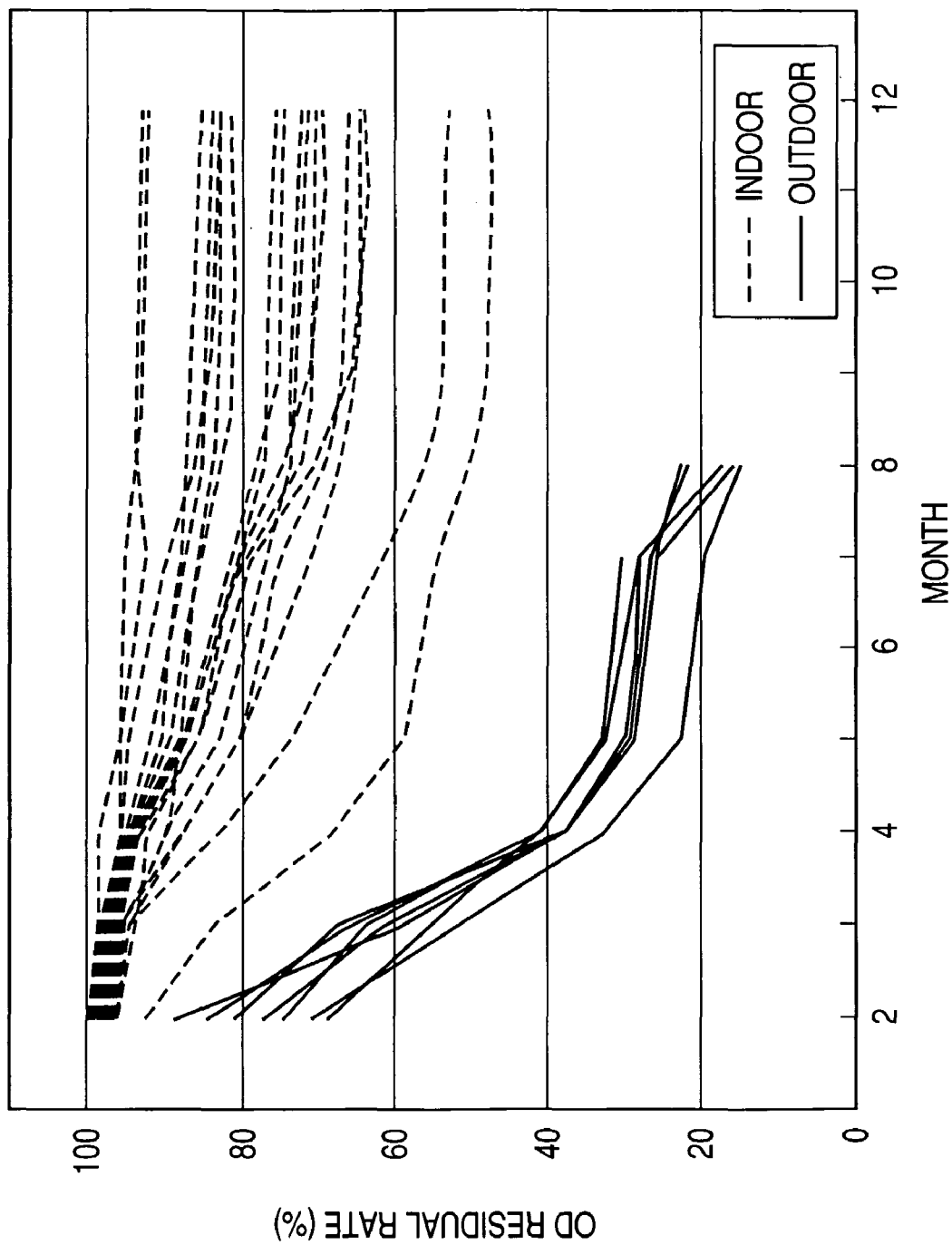
FIG. 5 is a graph showing an ink-jet image degradation degree in indoor and outdoor environment throughout the year.
Figure 6:
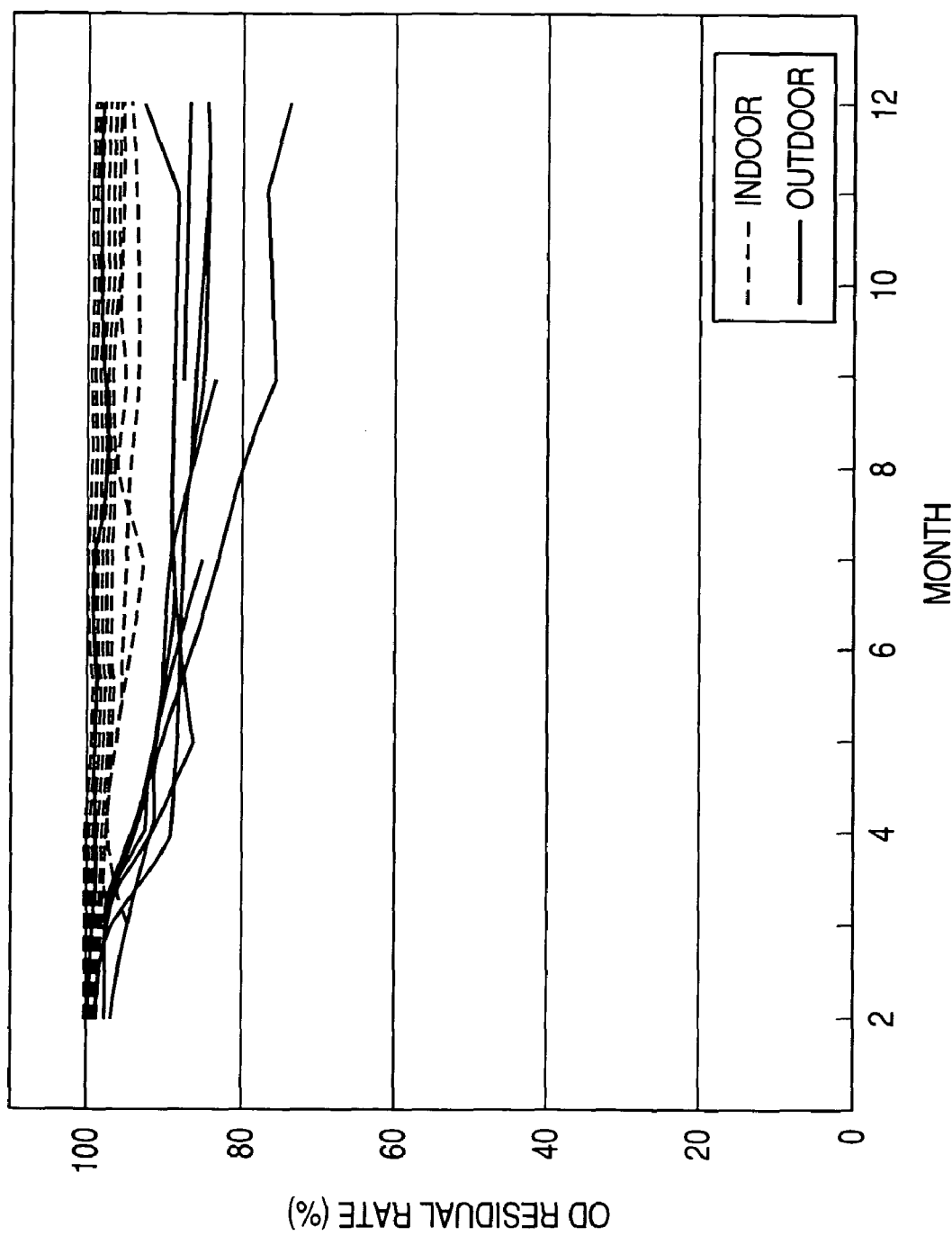
FIG. 6 is a graph showing a silver halide photo image degradation degree in indoor and outdoor environment throughout the year.

As can be seen from FIG. 5, the image degradation degree of the ink-jet image is higher in the time period from April to September than in winter. Further, the degradation behavior depends on the environment under which the image sample is placed, and the environment is roughly classified into indoor and outdoor (see FIG. 5). On the other hand, the silver halide photo image exhibits higher image fastness than the ink-jet image, as shown in FIG. 6. Even in the case where the silver halide photo image is preserved outdoor, the OD residual rate of its color, i.e. (image concentration after degradation)/(image concentration before degradation)×100, is 80% or more. This means that the image is still in good condition in spite of long-term preservation.

<Result of Multiple Linear Regression Analysis>

(1) Degradation of Ink-Jet Image

Figure 7:
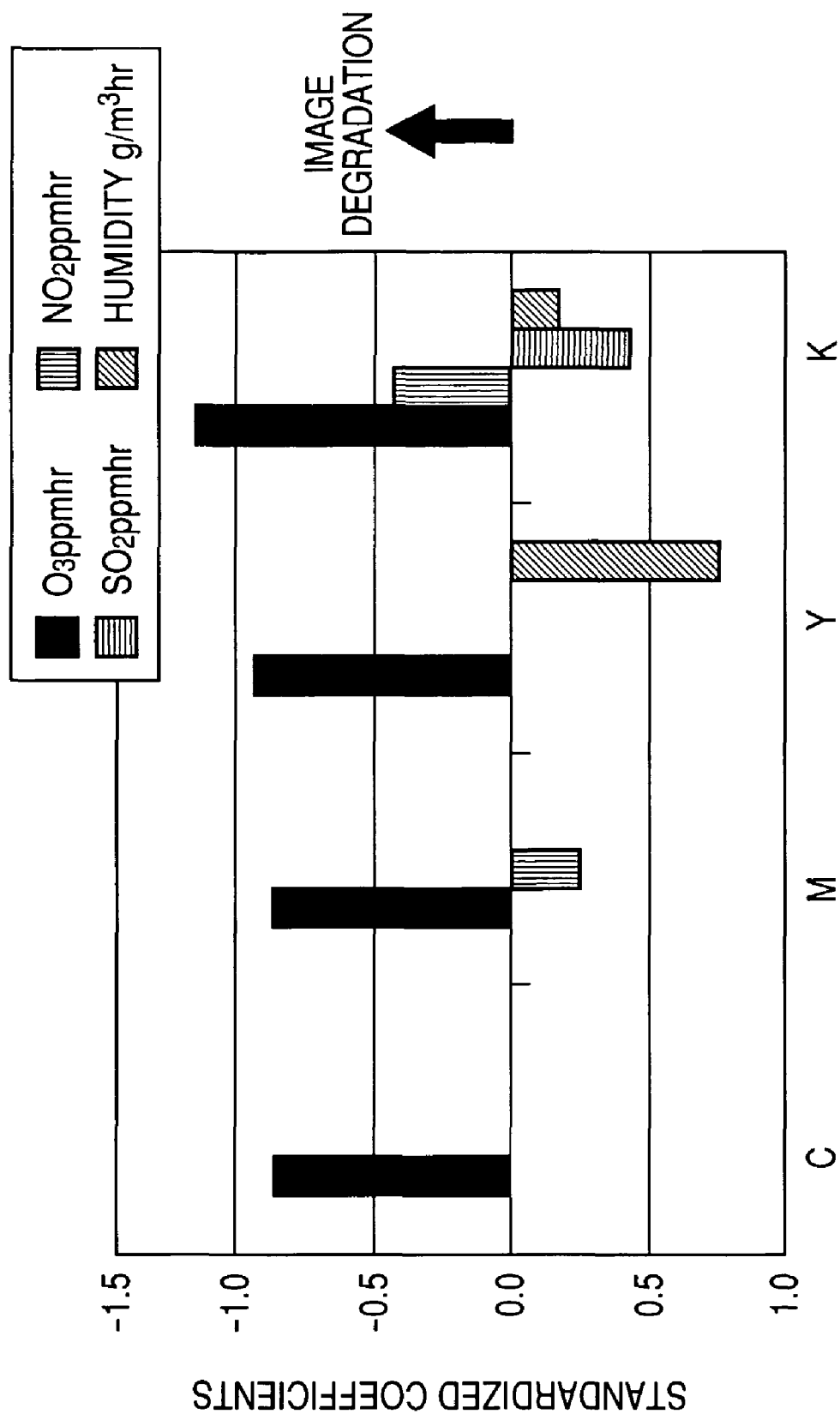
FIG. 7 is a graph showing the influence of ozone, nitrogen dioxide, sulfur dioxide, and humidity on the ink-jet image degradation.

FIG. 7 shows the result obtained by analyzing the relationship between environmental data and degradation of respective images by the multiple linear regression analysis. An extension of the coefficient of a factor in the direction of the arrow in FIG. 7 denotes that the factor causes the image degradation; on the other hand, an extension of the coefficient of a factor in the opposite direction of the arrow denotes that the factor contributes to suppression of the image degradation. C, M, Y, and K represent cyan, magenta, yellow, and black, respectively. As can be seen from FIG. 7, $O_3$ contributes to the ink-jet image degradation. In addition, there is some influence of $NO_2$ and $SO_2$. Of the two, the influence of $NO_2$ whose amount is larger is noticeable, in particular. The humidity apparently tends to contribute to suppression of the image degradation. From these, it can be seen that in addition to $O_3$, $NO_2$ and $SO_2$ (particularly, $NO_2$) have influence on the image degradation, and that the humidity has influence on migration and is involved in apparent image quality retention (see FIG. 7).

(2) Color Fading in Silver Halide Photo

Figure 8:
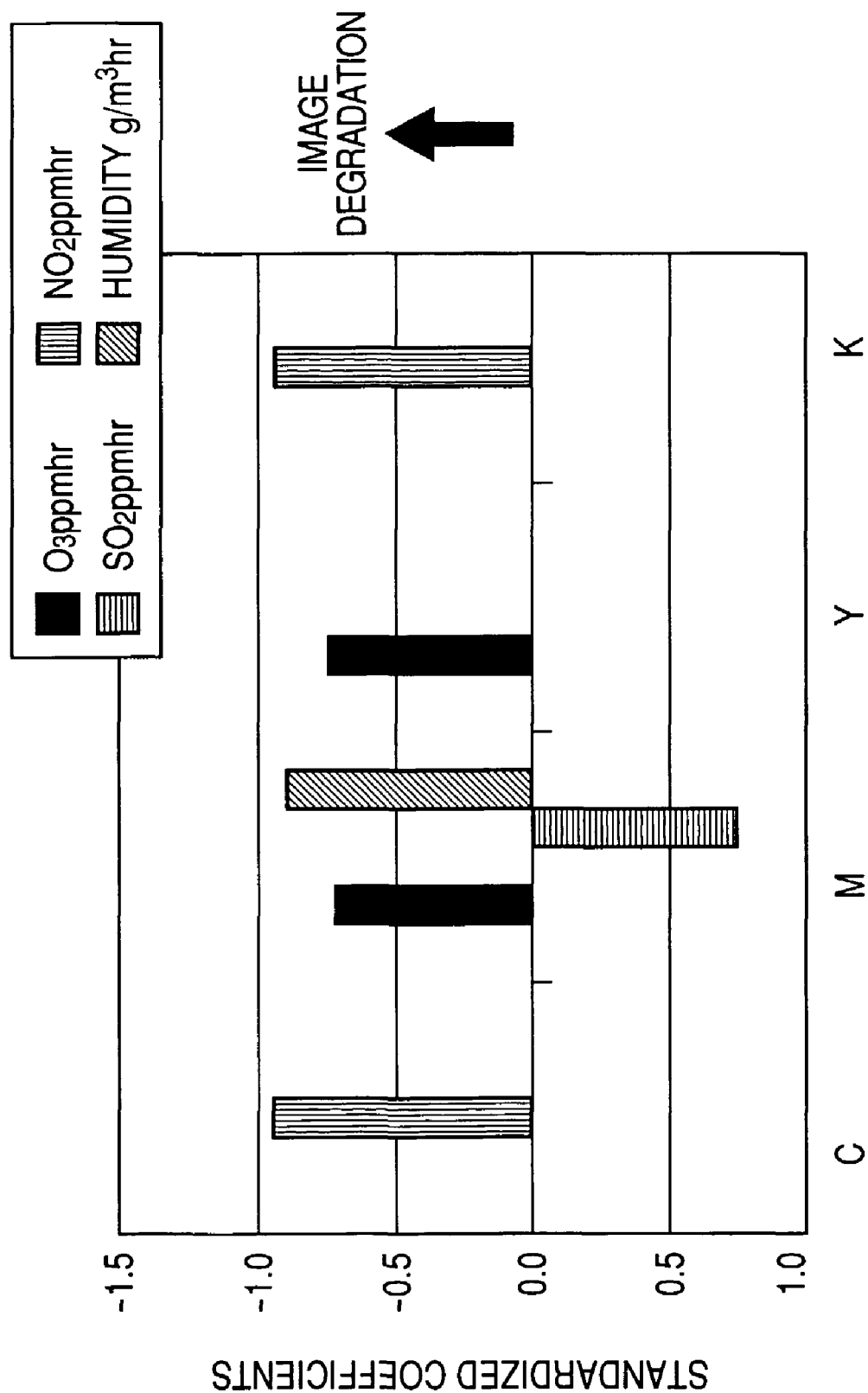
FIG. 8 is a graph showing the influence of ozone, nitrogen dioxide, sulfur dioxide, and humidity on the silver halide photo image degradation.

In the silver halide photo, as shown in FIG. 8, in addition to the influence of $NO_2$ and $O_3$ on the color fading in the photo image, the influence of humidity and $SO_2$ can be observed.

<Conclusion from Analysis of Real Room Environment>

For the purpose of examining the image fastness in real environment, measurements of gas and temperature/humidity in real environment and the image degradation behavior in the environment were performed. The result is that a concentration difference in ozone is large between indoor and outdoor, and gas ratio correspondingly differs between indoor and outdoor environment. It was found that, the ratios of $NO_2$ and $SO_2$ to ozone become higher in the indoor environment than in the outdoor environment.

Further, from the result of multiple linear regression analysis, the influence of $O_3$, as well as that of $NO_2$ and $SO_2$ (in particular, $NO_2$) on the degradation of ink-jet image can be seen, and the influence of these gases on the silver halide photo image can also be confirmed. It can be considered from the above fact that, in the evaluation of digital photo image fastness (in particular, image degradation due to gas), it is possible to simulate real environment more accurately by performing the evaluation not by using only $O_3$, but by using $O_3$ and other gases such as $NO_2$ and $SO_2$ in a mixed manner. This proves that it is possible to perform a more reliable and equitable accelerating test by including environmental factors existing abundantly in real environment, for example, oxidative gases like this time ($NO_2$ and $SO_2$) in performing the evaluation of the fastness of various types of digital photo images.

(Examination of Image Degradation-Accelerating Test Using Mixed Gas)

<Test Sample>

A test sample of the ink-jet image was printed on PR101 using Cannon PIXUS F900. As patches to be measured, portions of OD=1.0 in cyan (C), magenta (M), yellow (Y), and black (B) were used. With regard to black, OD of cyan (Kc), magenta (Km), yellow (Ky) were measured respectively in order to evaluate color balance. Similarly, the patches OD=1.0 were used for the silver halide photo.

<Mixed Gas Test>

The concentration condition of the mixed gas used in an image degradation-accelerating test is shown in Table 2. In view of the actual measurement average value of the concentration of $O_3$, $NO_2$, and $SO_2$ in room environment, which has been obtained by the abovementioned long-term measurement, the concentration of each gas was set such that the concentration ratio between $O_3$, $NO_2$, and $SO_2$ in respective conditions A to D becomes constant ratio of 3:18:1. The test was performed with a cycle of 72 hours exposure under the condition of a temperature within a test tank of 24° C. and humidity of 60%. For comparison, a test using only $O_3$ was performed as condition E. Note that the unit of the gas amount is ppb in the Table 2.

TABLE 2

| Mixed gas concentration condition in exposure test [ppb] | | | |
| --- | --- | --- | --- |
| | $O_3$ | $NO_2$ | $SO_2$ |
| Ratio of actual measurement average value in indoor environment | 3 | 19 | 1 |
| Mixed gas concentration condition A | 75 | 450 | 25 |
| Mixed gas concentration condition B | 150 | 900 | 50 |
| Mixed gas concentration condition C | 225 | 1350 | 75 |
| Mixed gas concentration condition D | 300 | 1800 | 100 |
| Gas concentration condition E | 300 | — | — |

<Result and Consideration>

<Image Degradation Behavior in Mixed Gas Test>

Figure 9:
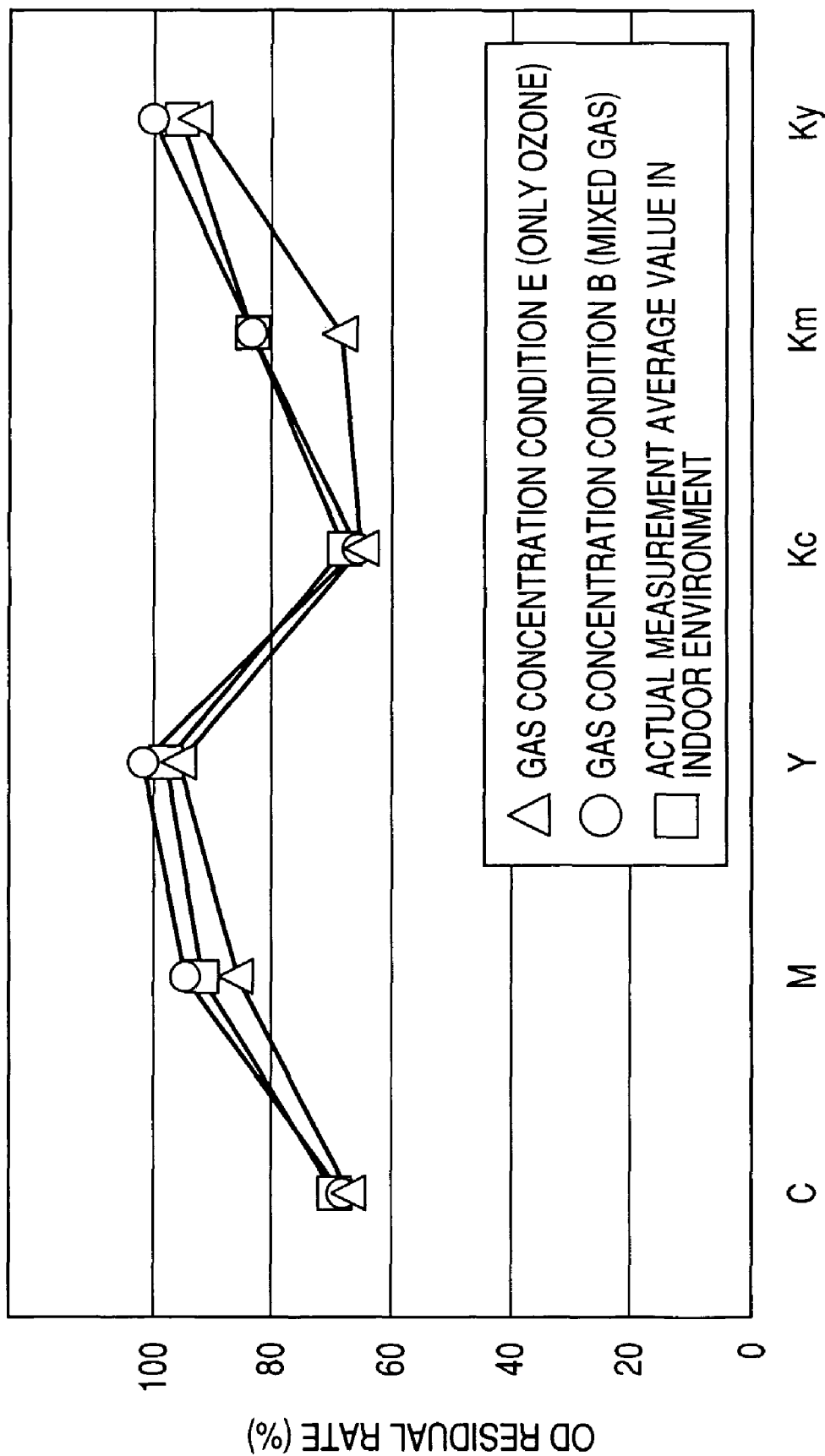
FIG. 9 is a graph showing the comparison between the OD survival rate (%) of the ink-jet image after the gas test performed under specified condition and the average value of the OD survival rate after one year from the start of the real environmental test.

FIG. 9 shows the comparison between the OD survival rate (%) of the ink-jet image after the gas test performed under the gas concentration condition B (mixed gas) and concentration condition E (only ozone gas) and the average value of the OD survival rate after one year from the start of the real environmental test in the Table 2. The result of the mixed gas test (condition B) substantially corresponds to the average value of the real environmental test, so that it is possible to regard a one cycle of the mixed gas test under the gas concentration condition B as a one-year real environmental condition of image degradation. The gas exposure cumulative amount (cumulative amount of gas concentration and exposure time) is 10.8 ppm·h in terms of ozone gas, which is about 40% of the gas exposure cumulative amount 26.3 ppm·h of the measurement value (average) obtained in room environment.

On the other hand, in the gas test using only ozone gas, the color fading of magenta is more noticeable than in the real environmental test. In particular, the color fading of the magenta OD in black (composite) is noticeable. The color fading balance is an important factor in determining the end point of the image degradation and it can be concluded that the gas test using only the ozone gas is questionable as the accelerating test method. In the mixed gas test, on the other hand, the OD survival rates of respective colors substantially correspond to average values in the real environmental test. Further, in terms of the color fading balance (difference in hue angle), the color fading of the image caused in real environment can be reproduced in a correlated manner.

Figure 10:
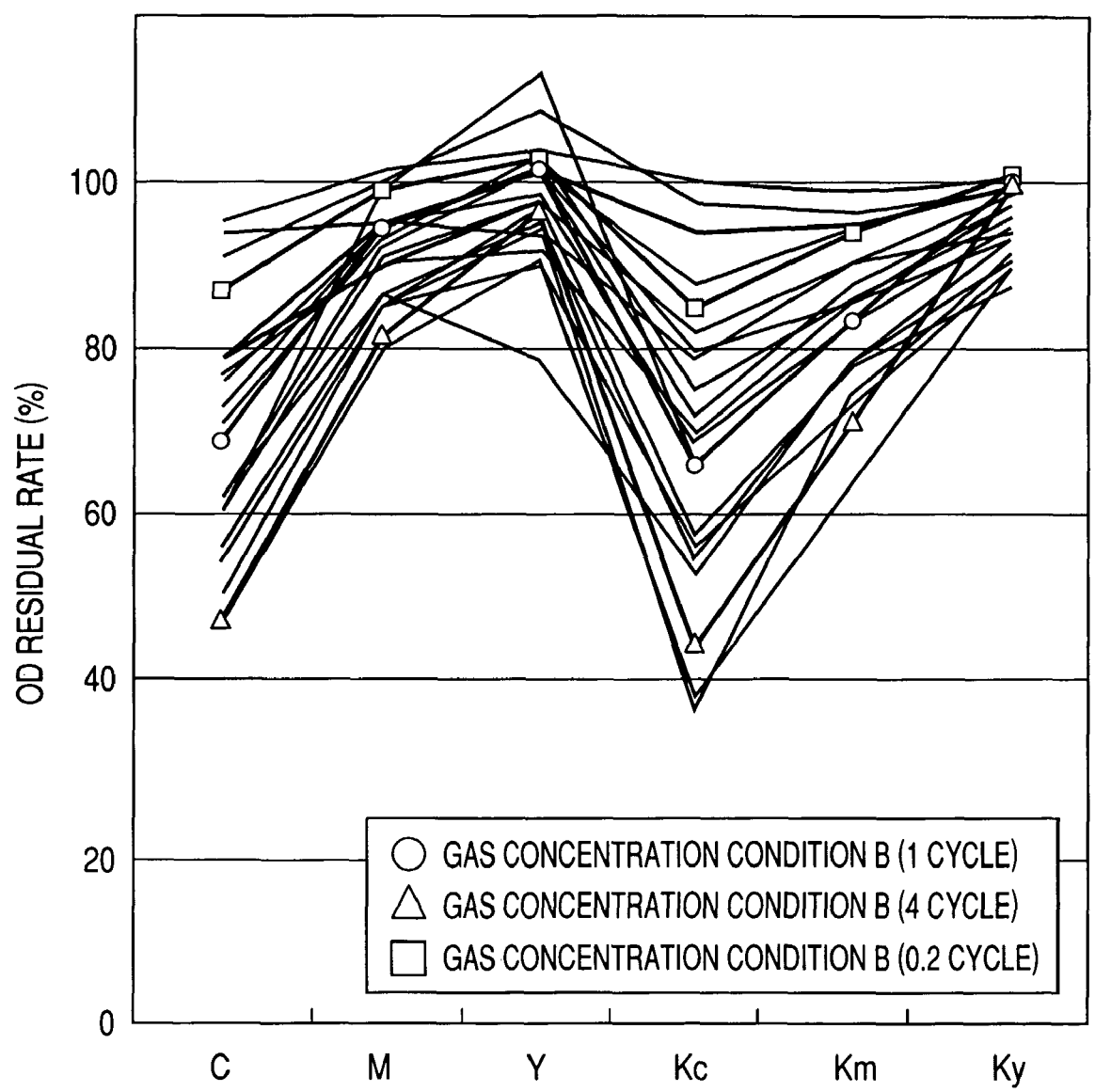
FIG. 10 is a graph showing the comparison between the OD survival rate (%) of the ink-jet image obtained when the gas test is performed with exposure time of mixed gas changed and the data of the one-year test performed under real environment (home and office)
Figure 11:
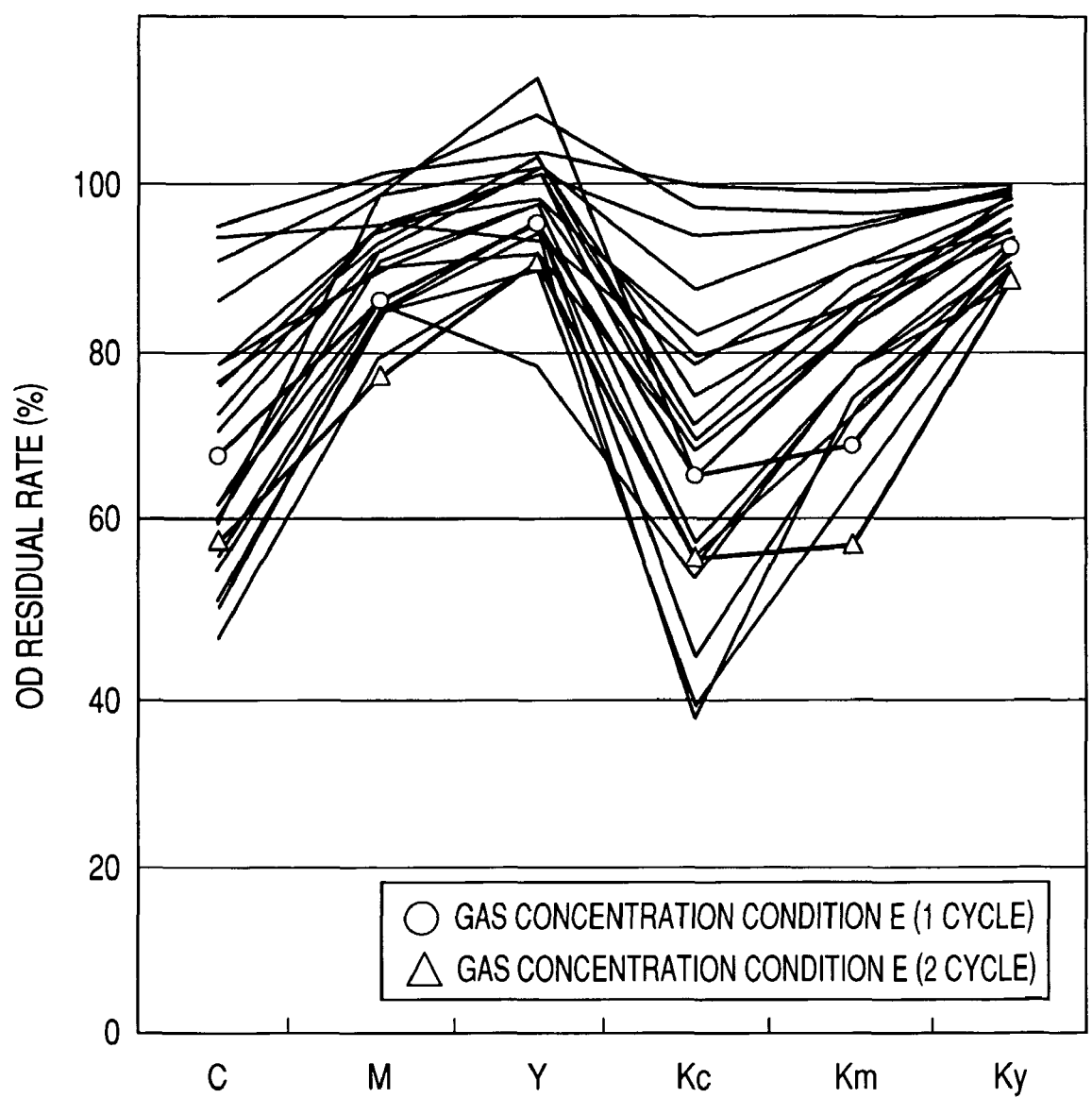
FIG. 11 is a graph showing the comparison between the OD survival rate (%) of the ink-jet image obtained when the gas test is performed with exposure time of ozone gas changed and the data of the one-year test performed under real environment (home and office)
Figure 12:
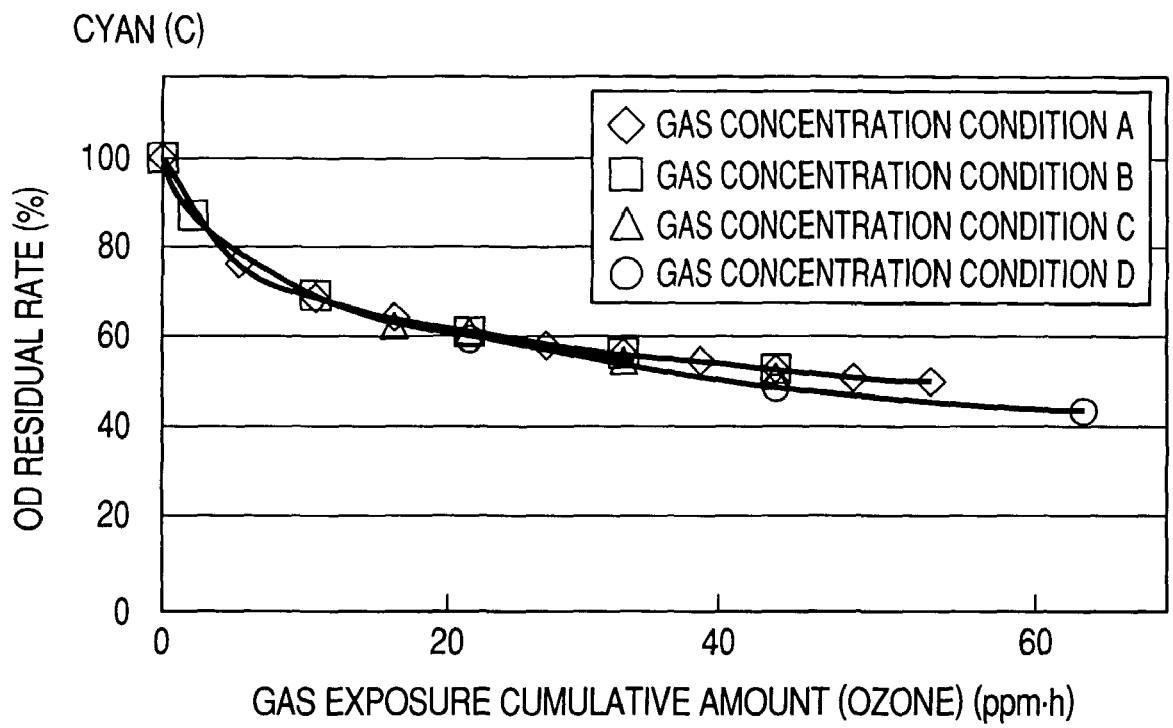
FIG. 12 is a graph showing the relationship between the OD survival rate (%) of a cyan patch and the gas exposure cumulative amount (ozone concentration: ppm·h) in the case where the entire gas concentration is changed with a constant concentration ratio of the mixed gas.
Figure 13:
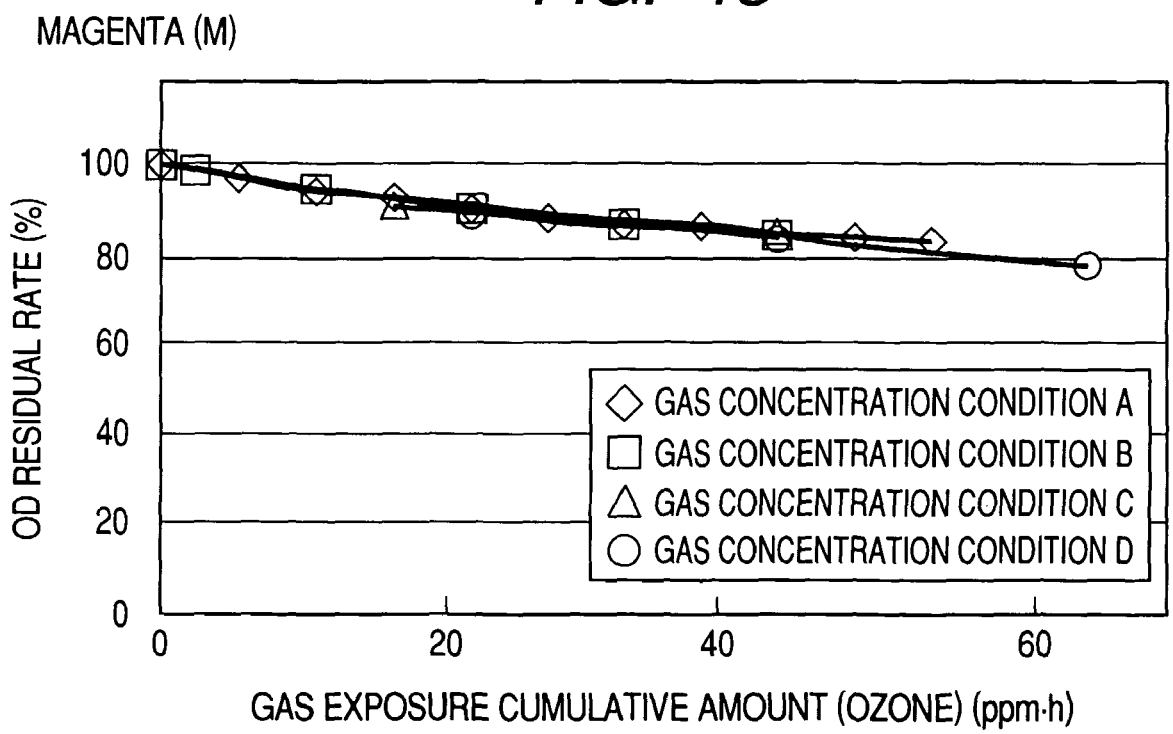
FIG. 13 is a graph showing the relationship between the OD survival rate (%) of a magenta patch and the gas exposure cumulative amount (ozone concentration: ppm·h) in the case where the entire gas concentration is changed with a constant concentration ratio of the mixed gas.
Figure 14:
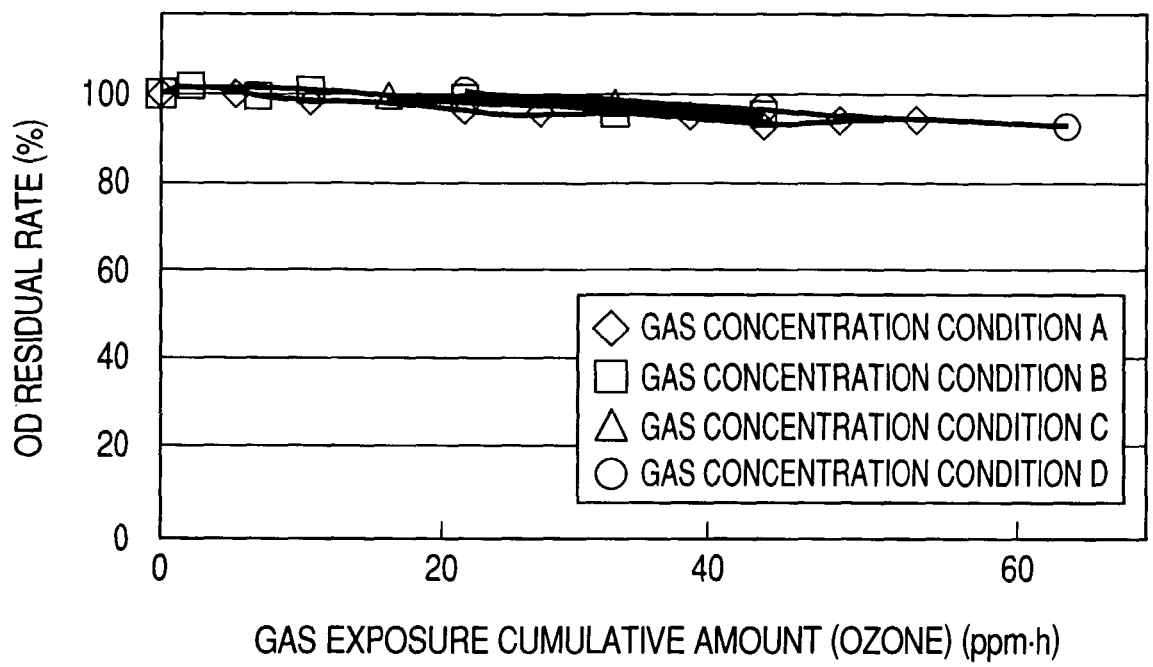
FIG. 14 is a graph showing the relationship between the OD survival rate (%) of a yellow patch and the gas exposure cumulative amount (ozone concentration: ppm·h) in the case where the entire gas concentration is changed with a constant concentration ratio of the mixed gas.
Figure 15:
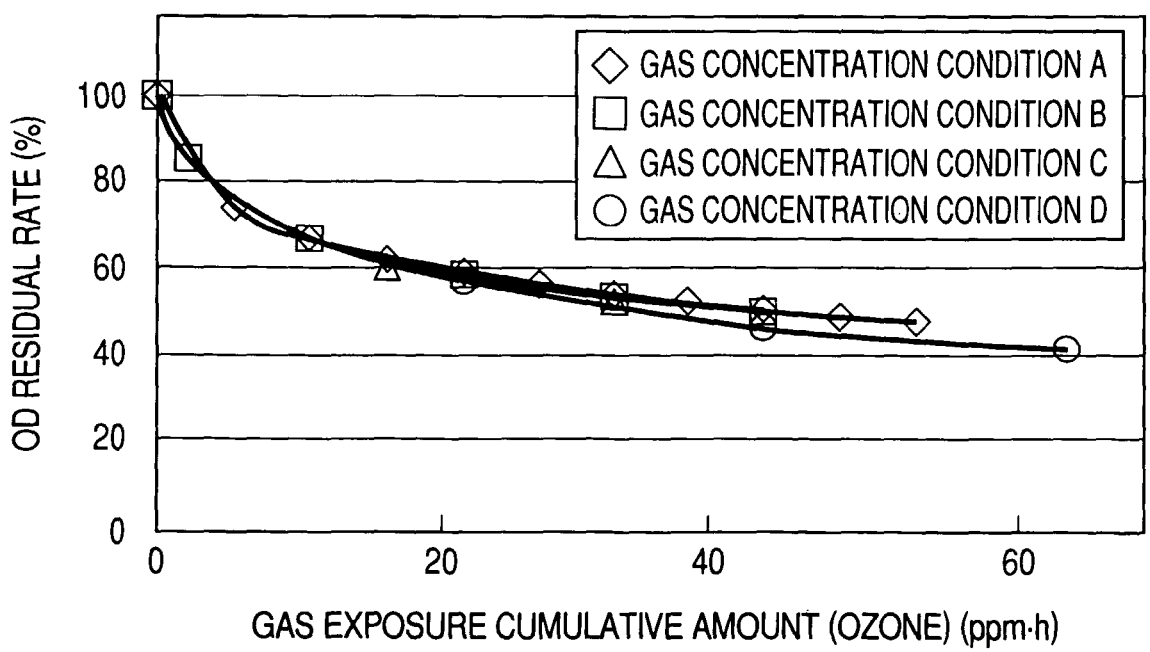
FIG. 15 is a graph showing the relationship between the OD survival rate (%) of cyan component of a black patch and the gas exposure cumulative amount (ozone concentration: ppm·h) in the case where the entire gas concentration is changed with a constant concentration ratio of the mixed gas.
Figure 16:
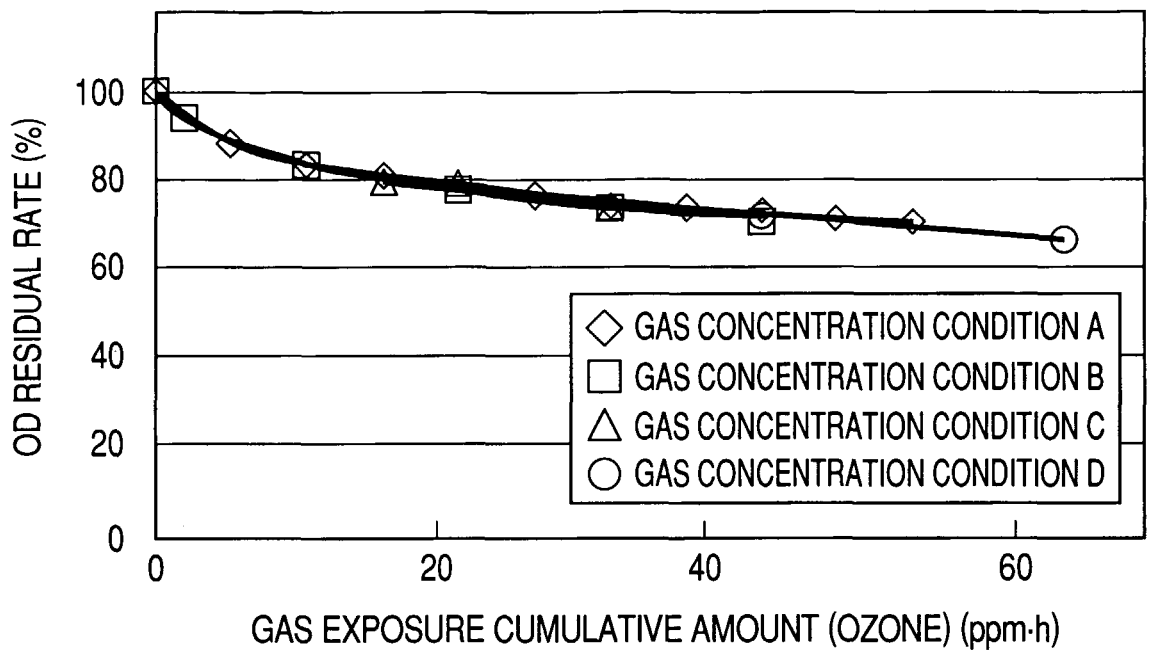
FIG. 16 is a graph showing the relationship between the OD survival rate (%) of magenta component of a black patch and the gas exposure cumulative amount (ozone concentration: ppm·h) in the case where the entire gas concentration is changed with a constant concentration ratio of the mixed gas.
Figure 17:
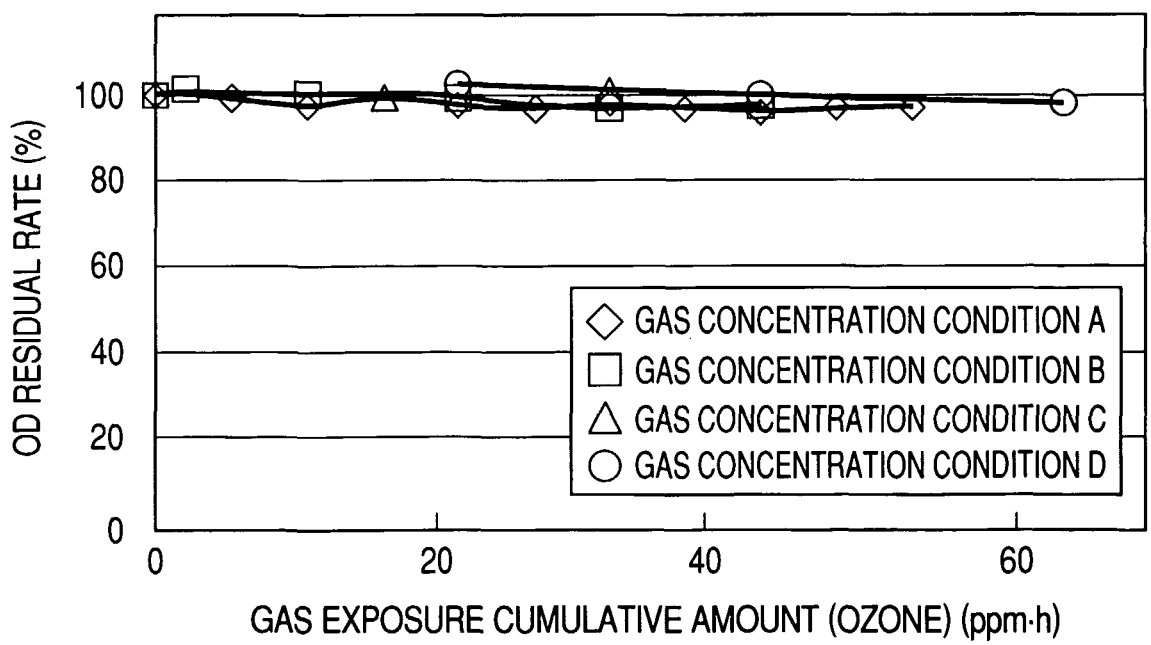
FIG. 17 is a graph showing the relationship between the OD survival rate (%) of yellow component of a black patch and the gas exposure cumulative amount (ozone concentration: ppm·h) in the case where the entire gas concentration is changed with a constant concentration ratio of the mixed gas.

FIGS. 10 and 11 show the comparison results between the OD survival rate (%) of the ink-jet image obtained when the test is performed with exposure time of mixed gas changed under the gas concentration condition B (mixed gas) (FIG. 10) and gas concentration condition E (only ozone gas) (FIG. 11) and the data of the one-year test performed under real environment (home and office). As can be seen from FIGS. 10 and 11, in terms of the color fading of the image under real environment, although the absolute value of the OD survival rate (%) greatly differs depending on the locations that the images have been placed, there is not much difference in the color fading balance between the locations. The image degradation-accelerating test using the mixed gas, the result of which is indicated by the thick solid line in FIG. 10, can reproduce the difference in the absolute value depending on the locations obtained in real environment by changing the exposure time while maintaining the color fading balance. On the other hand, unlike the above method according to the present invention, the image degradation-accelerating using only ozone gas, the result of which is indicated by the thick solid line in FIG. 11, cannot reproduce, in a correlative manner, the image degradation by the exposure test under indoor real environment in terms of the color fading balance even when the exposure time is changed. Note that, in FIGS. 9 to 11, plots of respective colors are connected by the solid line for easy visual identification of the difference in the color fading balance.

<Concentration Dependency of Mixed Gas Test>

FIGS. 12 to 17 show the relationship between the OD survival rate (%) of the respective color patches in the case where the entire gas concentration is changed with a constant concentration ratio of the mixed gas (of three gas species) and gas exposure cumulative amount (ozone concentration: ppm·h). As can be seen from FIGS. 12 to 17, the gas concentration cumulative value and OD survival rate (%) corresponds to each other in the gas concentration range (75 ppb to 300 ppb in terms of ozone concentration value) used in this test irrespective of the gas concentration.

<Application of Mixed Gas Test to Silver Halide Photo>

Figure 18:
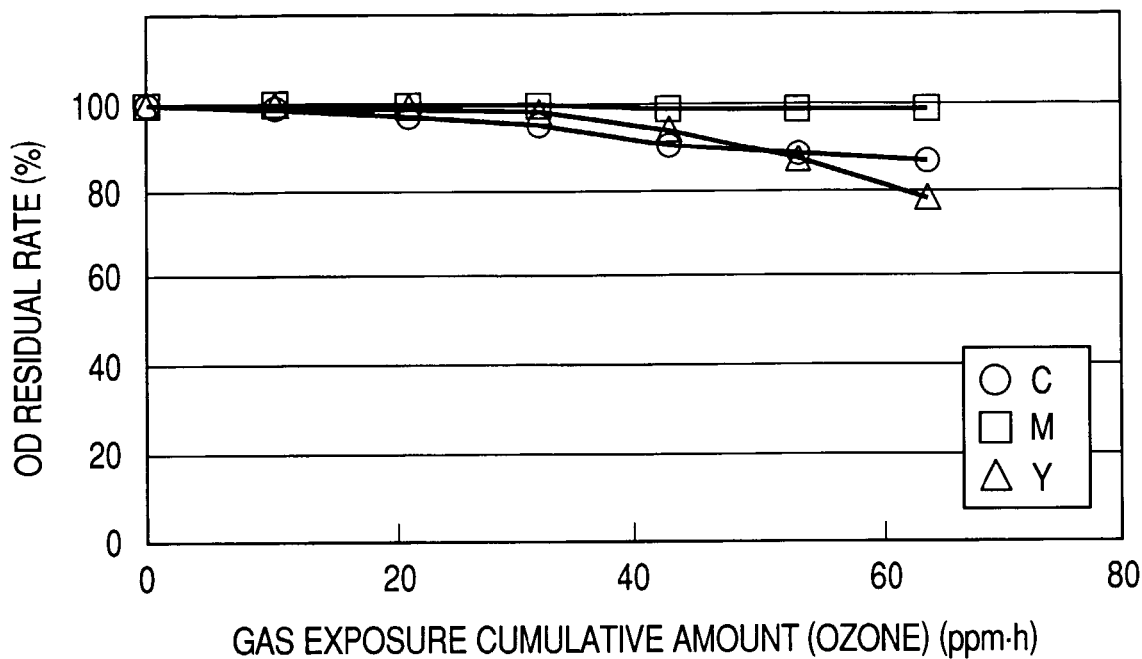
FIG. 18 is a graph showing the relationship between the OD survival rate (%) of the silver halide photo image and the mixed gas exposure cumulative amount (ppm·h)
Figure 19:
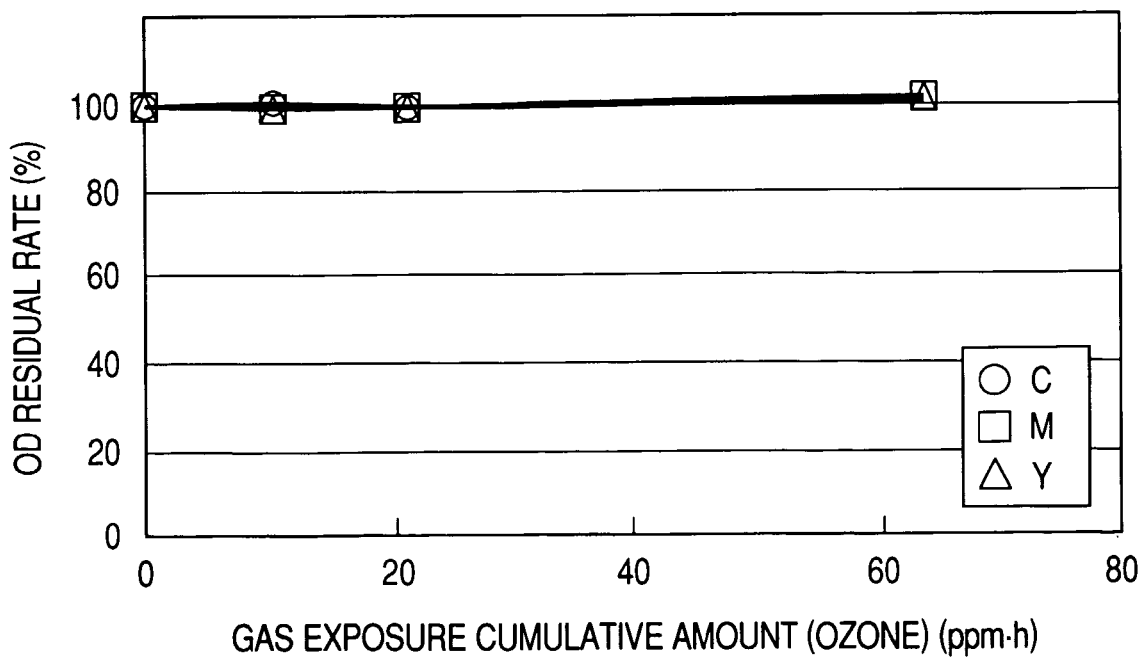
FIG. 19 is a graph showing the relationship between the OD survival rate (%) of the silver halide photo image and the ozone gas exposure cumulative amount (ppm·h)

Next, a trial of applying the examined image degradation-accelerating test using the mixed gas (mixed gas test) to the silver halide photo image was made. FIGS. 18 and 19 show the results of the image degradation-accelerating tests using the mixed gas (FIG. 18) and only ozone gas (FIG. 19) for the silver halide photo. In the ozone gas test, the color fading hardly occurs in the silver halide photo for which the image degradation-accelerating test has been performed although the photo image has been subjected to the ozone gas exposure whose value is as high as not less than 60 ppm·h; whereas, in the mixed gas test according to the present invention, the OD survival rate has been decreased in such a degree that the color fading can sufficiently be recognized with the exposure of about 5 cycles (corresponding to 5 years in the case of ink-jet image) of standard gas concentration condition. Currently, 3 years has passed since the start of the real environment (room) preservation of the silver halide photo image, even in the longest one. Therefore; it is impossible to actually confirm the correlation between the image degradation-accelerating method according to the present invention and the image degradation caused in the case where the silver halide photo image has been preserved in real environment for a long time period. However, even some data obtained up to now show the OD survival rate is reduced to about 90% depending on the location that the image has been placed. This color fading cannot be reproduced in the image degradation-accelerating test using only ozone gas at all.

As described above, the examination of fastness of the silver halide photo for the gas is still in the stage of simulation, since the data related to the real environmental preservation has not sufficiently accumulated. From now on, it is possible to increase accuracy of the simulation of the image degradation of the silver halide photo in room bare preservation by accumulating the data related to the real environmental preservation, as well as examining in detail the degradation behavior of the silver halide photo image in the mixed gas test obtained up to now.

<High Fastness Dye Ink>

Figure 20:
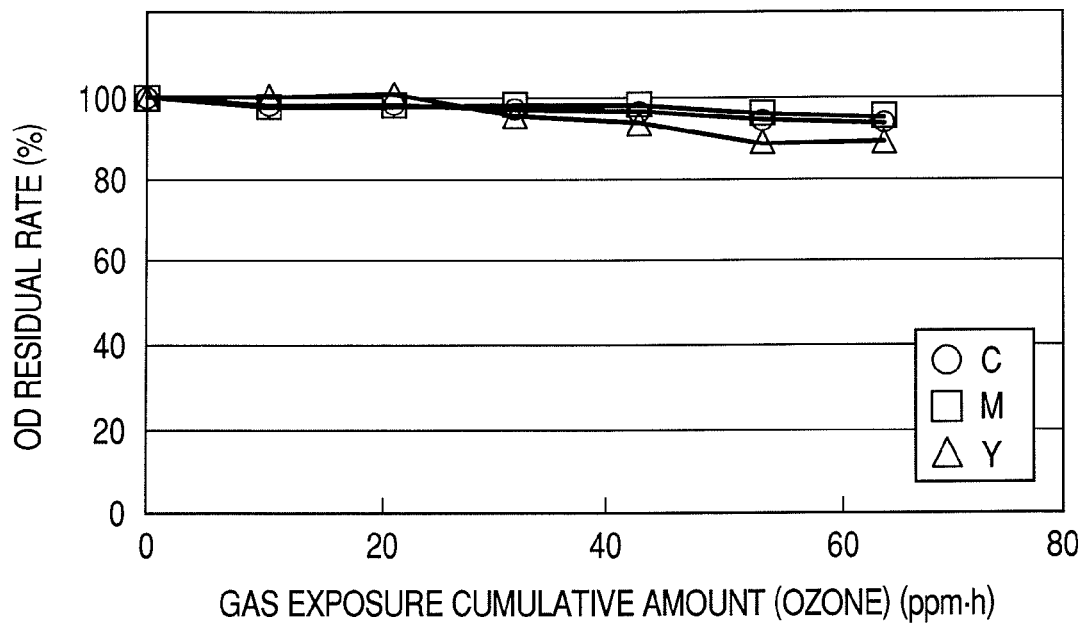
FIG. 20 is a graph showing an example of the mixed gas test for the ink-jet image using specified dye ink.

FIG. 20 shows the result of the mixed gas test according to the present invention performed for the ink-jet image formed using an example of dye ink designed based on the image degradation-accelerating test using the mixed gas which has been obtained in the extensive studies carried out by the inventors of the present invention. As shown in FIG. 20, it was confirmed that there is a dye in which the gas resistance, which is the weak point of the image formed using the dye ink, has significantly been improved. The use of such a dye ink allows gas resistance (mixed gas test) that outstrips the gas resistance of the silver halide photo to be realized. When the high fastness dye ink type ink-jet system satisfying both image quality and fastness is put to practical use, the importance of the ink-jet printer as a photo image output machine is expected to increase more and more.

<Summary of Examination on Image Degradation-Accelerating Method Using Mixed Gas>

The following conclusions can be drawn from the above examination results:

(1) The gas resistance test method for image (image degradation-accelerating method) according to the present invention can faithfully reproduce the image degradation of the ink-jet image (PIXUS F900, PR101) in real indoor environment in a correlated manner.

(2) The gas resistance test method for image according to the present invention can allow the color fading to occur in the silver halide photo, the image of which is not degraded in the test using only ozone gas. It can be considered from the above that the test method according to the present invention faithfully reproduces the image degradation of the silver halide photo that has been placed in indoor environment for a long time period in a correlative manner.

(Mixed Gas)

The mixed gas used in the present invention contains ozone and nitrogen dioxide with the concentrations in the mixed gas being 75 ppb or more and 150 ppb or more, respectively. That is, when the gas amounts become less than the above values, the control of the gas amounts in a test apparatus becomes difficult, thereby making it difficult to perform the accurate simulation. The preferable ratio between ozone and nitrogen dioxide is a range from 1:2 to 1:10. Note that, among the ratios, 1:2 and 1:10 are included in the preferred ratio. This ratio range is a reflection of the environment analysis result that the ratio of indoor environment gas concentration average throughout the year is $O_3$ $NO_2$:$SO_2$=3 ppb:19 ppb:1 ppb and is obtained by defining the ratio of ozone and nitrogen dioxide having a more profound effect. It is preferable that the ozone concentration be not more than 300 ppb and that the nitrogen dioxide concentration be not more than 3000 ppb. Further, it is preferable that the sulfur dioxide concentration be not less than 25 ppb and not more than 3000 ppb.

According to the examination of the present inventors, the range defined as described above sets the concentration of the oxidative gas (nitric acid, etc.) generated by the coexistence of ozone and nitrogen dioxide to an adequate value, thereby designing acidic atmosphere more close to room environment. As a result, image degradation corresponding to the image degradation caused in room environment where the ink-jet image is usually preserved (placed) can be caused in an accelerated and correlative manner.

As described above, sulfur dioxide is included with the above ratio in real environment and this sulfur dioxide also has an effect on the gas resistance of the image. Therefore, it is preferable that sulfur dioxide be contained in the mixed gas, and that the ratio between ozone, nitrogen dioxide, and sulfur dioxide be 3:19:1. The concentrations and ratios of the test gas in the present invention are all represented by volume ratio. Other gases can be mixed with the mixed gas used in the present invention. Examples of the other gases include hydrogen sulfide, ammonia, chlorine, hydrogen chloride, and hydrogen fluoride.

In the present invention, in the case where the mixed gas consists of ozone and nitrogen dioxide, it is preferable that the mixed gas be obtained by individually diluting ozone and nitrogen dioxide and then mixing them. Similarly, in the case where the gases other than ozone and nitrogen dioxide are used, it is preferable to perform the mixing after individually diluting them.

(Supply Means of Mixed Gas)

In the gas resistance test method for image according to the present invention, the mixed gas is continuously supplied to the surface of the image sample at a flow rate not less than 0.2 m/s and not more than 3.0 m/s. The reason is that, according to the examination of the present inventors, the continuous supply of a specified mixed gas at a flow rate not less than 0.2 m/s and not more than 3.0 m/s can prevent concentration gradient [gas concentration is reduced more at an area closer to the surface (this is particularly noticeable in an ink-jet recording medium having an ink absorbing layer using alumina and the like)] caused near the surface of the sample image with the result that it is possible to design the mixed gas atmosphere around the image sample to be evaluated with the amount of ozone and nitrogen dioxide defined by the present invention and, more preferably, it is possible to specify the ratio between ozone and nitrogen dioxide in the mixed gas. On the other hand, when the mixed gas is supplied to the surface of the image sample at a flow rate less than 0.2 m/s, the gas concentration distribution in the test tank becomes uneven, preventing the gas resistance test for image to be performed with accuracy. Further, when a flow rate exceeds 3.0 m/s, the flow of the mixed gas severely vibrates the sample in the test tank, which may cause uneven atmosphere around the sample.

As a means for supplying the mixed gas to the surface of the image sample at the above flow rate, which is not particularly limited, a method that provides a stirring fan to supply circulation wind to the sample; another method that previously specifies the types of the gas to be mixed, adjusts the mixed gas to predetermined concentration, temperature and humidity and directly sprays the mixed gas to the surface of the image sample at a predetermined flow rate; and the like can be used.

Further, according to the examination of the present inventors, when the measurement result of image degradation is compared between the result obtained in real environment and the gas resistance test method for image (image degradation-accelerating test) according to the present invention in which a specified mixed gas is used, the result of the image degradation obtained by 1 year real environmental test corresponds to the image degradation caused during 72 hours of the gas resistance test method for image according to the present invention. Here, the total exposure amounts (ppm·h) (cumulative exposure amount) of respective gases to which the surface of the image has been exposed are calculated. The calculation is performed with, for example, the ozone concentration. Since the annual average of total exposure amount of ozone obtained in real environment is 3 ppb, the annual total exposure amount in real environment is 3 ppb·year×365 day/year×24 h/day=26280 ppb·h=26 ppm·h. Assuming that the ozone concentration used in the gas resistance test method for image according to present invention is 150 ppb, the total exposure amount (cumulative exposure amount) is 150 ppb× 72 hr=10,800 ppb·h=11 ppm·h. As described above, the total exposure amount to the surface of the image sample differs between the real environment test and image degradation-accelerating test using the mixed gas.

According to the examination of the present inventors, the factors for the above difference include the relative humidity within the test tank and the flow rate of the mixed gas on the surface of the sample. With regards to the relative humidity, the color fading easily occurs in high humidity and it hardly occurs in low humidity. With regard to the flow rate on the surface of the image sample, the color fading easily occurs at a high flow rate and it hardly occurs at a low rate. As described above, in order to endure even gas concentration distribution in the test tank, it is necessary to supply the gas to the surface of the image sample at a flow rate 0.2 m/s or more; whereas, the gas in real indoor environment moves at 0.1 m/s or less, making it difficult to reproduce the flow rate of real environment in test tank. Therefore, it is preferable to make the following correction that considers about collision frequency of the test gas to the image sample in calculating the cumulative exposure amount in the accelerating test.

(Cumulative Exposure Amount in Accelerating Test considering about collision frequency)=(Cumulative exposure amount in accelerating test)×(Flow rate in accelerating test)/(Flow rate in real environment)

where flow rate is the rate at which the mixed gas whose concentration has been adjusted to a predetermined value flows on the surface of the sample.

The above expression is effective to the flow rate in the vertical direction with respect to the image sample surface, and it is approximately effective to the flow rate in the horizontal direction with respect to the image sample surface as a correction for the concentration gradient near the sample surface. Therefore, it is preferable that the expression be used when the value of the flow rate in the horizontal direction with respect to the sample surface is not more than 1.0 m/s. Further, it is preferable that the flow rate in the accelerating test be fixed to 1.0 m/s in the case where the flow rate in the horizontal direction is not less than 1.0 m/s.

Further, for the configuration of the test method, it is preferable that the image sample in the test tank be revolved (circulated) at about 1 rpm. That is, the revolution (circulation) of the image sample can equalize the gas concentration in the test tank. It is preferable that the revolution (circulation) speed of the sample image, which is not particularly limited, be adjusted so as not to severely vibrate the sample image. The gases contained in the mixed gas used in the present invention may be individually supplied to the test tank, or may previously be mixed and supplied to the test tank. Further, a means for supplying gas may be realized by using a gas generator or using a commonly-used gas tank.

(Measurement Method of Flow Rate Near Image Sample Surface)

In the present invention, the mixed gas containing at least ozone and nitrogen dioxide is continuously supplied to the surface of the image sample at a flow rate not less than 0.2 m/s and not more than 3.0 m/s. The use of a flow rate meter near the sample surface in the test tank (concretely, a portion about 1 centimeter apart from the sample surface) allows easy measurement of the flow rate.

Further, it is preferable in the gas resistance test method for image according to the present invention that the image sample placed in the test tank be circulated in the test tank. With this configuration, it is possible to reliably supply the mixed gas to the surface of the image sample. In this case, measurement of the flow rate near the image sample surface is performed in a stationary state of the image sample. When the mixed gas is continuously supplied to the sample surface at a flow rate not less than 0.2 m/s and not more than 3.0 m/s in this stationary state, this configuration fits the requirements of the present invention. In other words, the continuous supply of the mixed gas at this flow rate prevents the respective components of the mixed gas from being consumed due to absorption on the surface of the sample, thereby preventing concentration gradient from being caused near the surface of the sample image.

(Test Temperature and Humidity)

In the gas resistance test method for image according to the present invention, it is preferable that a temperature control means and humidity control means be provided in the test tank. With this configuration, it is possible to more accurately and simply simulate the resistance of the image under specified environment with, for example, a temperature of 24° C. and humidity of 60% RH. It is preferable to use a control means of a heat exchange type as the temperature control means. As the humidity control means, it is preferable to provide a means that perform humidification with vapor obtained by heating water at a location other than a location within the test tank. Further, it is preferable that the humidity control means have a water droplet protection mechanism that prevents the water droplet generated from the vapor from entering the test tank. With this configuration, it is possible to perform an accurate gas resistance test even for the ink-jet recording method that uses a material sensitive to temperature and humidity.

(Ink Set)

The ink set according to the present invention is an ink set obtained by combining a plurality of inks. The ink set is characterized in that when the images formed of respective inks are subjected to the gas resistance test for 360 hours in succession under the following conditions (1) and (2), differences between the image concentration (OD) survival rates of all inks obtained in the accelerated test fall below 1%:

(1) The ozone concentration in the mixed gas is not less than 75 ppb and the nitrogen dioxide concentration in the mixed gas is not less than 150 ppb.

(2) The mixed gas is continuously supplied to the sample surface at a flow rate not less than 0.2 m/s and not more than 3.0 m/s.

The ink set mentioned here includes an ink set independently including a combination of inks, an ink tank formed by a plurality of ink tanks in an integrated manner, as well as a state where a plurality of single ink tanks are used all together. Further, the ink set may be formed integrally with a head section. It is preferable for the ink set according to the present invention to be used in a disposable ink cartridge.

(Test Apparatus)

Figure 21:
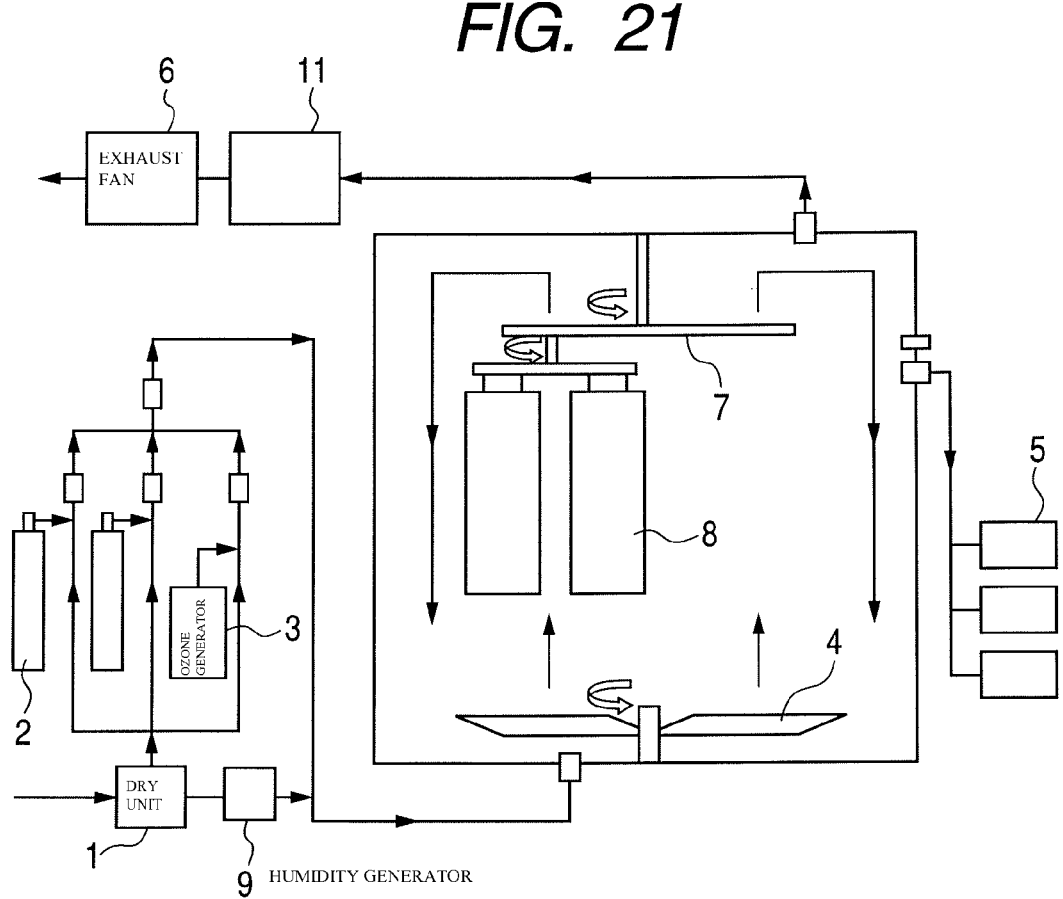
FIG. 21 is a view showing an example of preferred test apparatuses for the gas resistance test.

FIG. 21 shows an example of a preferred configuration of a test apparatus that performs the gas resistance test method for image according to the present invention. Hereinafter, the configuration of the test apparatus will be described. The test apparatus, which is a preferred embodiment of the present invention, is an example of a simple apparatus capable of including a configuration that performs a dark room test without the influence of light. After the high-concentration gas from $NO_2$ and $SO_2$ tanks 2 and an ozone generator 3 is diluted with air dried in a dry unit 1 such that the gas concentration values in respective test tank 5 become a predetermined value, the mixed gas obtained by mixing the respective diluted gas is supplied to a test tank at a constant flow rate. A humidity generator 9 uses some diluting air to control the humidity in the test tank. Test temperature control may be realized by performing temperature control of the air for dilution, or performing temperature control of the test tank inner wall (not shown). The mixed gas used in the test apparatus having the above configuration is continuously supplied to a sample 8 at a predetermined flow rate by a stirring fan 4 provided in the test tank. The upper end of the sample 8 is fixed to a rotating sample holder 7 by a clip (although the lower end is not fixed in this case, it may be fixed). The rotating sample holder 7 rotates and revolves the sample 8. The mixed gas is supplied in the parallel direction with respect to the surface of the sample image. An exhaust fan 6 exhausts gas in the test tank at a constant flow rate and thereby the exhaust flow rate and supply flow rate correspond to each other.

EXAMPLE

Hereinafter, the present invention will be explained in detail with reference to Examples and Comparative examples.

Examples 1 to 7 and Comparative Example 1

The concentrations of $O_3$ and $NO_2$ ($SO_2$ is also used in Example 4) were set to those shown in Table 3, and the resultant gases were mixed to obtain mixed gas used in gas resistance tests for image of Examples 1 to 7 and Comparative Example 1. After that, an image sample was set within the test apparatus shown in FIG. 21, the mixed gas was supplied to the image sample surface in the parallel direction with respect thereto at a flow rate of 0.3 m/s by a fan provided in the test tank, and the gas resistance test for image was performed with a cycle of 72 hours exposure under the condition of a temperature of 24° C. and humidity of 60%. Note that the unit of the gas amount is ppb in the Table 3, and that, in Example 5, each of $O_3$, $NO_2$ and $SO_2$ was diluted by 10% and the concentrations thereof were set to those shown in Table 3.

TABLE 3

Gas concentration condition in exposure test [ppb]

| | $O_3$ | $NO_2$ | $SO_2$ | Component ratio in mixed gas |
|---|---|---|---|---|
| Example 1 | 150 | 900 | — | 1:6 |
| Example 2 | 150 | 300 | — | 1:2 |
| Example 3 | 150 | 1500 | — | 1:10 |
| Example 4 | 150 | 900 | 50 | 3:18:1 |
| Example 5 | 150 | 900 | — | 1:6 (use diluted gas) |
| Example 6 | 150 | 290 | — | 1:1.93 |
| Example 7 | 150 | 1510 | — | 1:10.07 |
| Comparative Example 1 | 300 | — | — | — |

(Ink-Jet Image Sample)

A test sample of the ink-jet image was printed on PR101 using Cannon PIXUS F900. As patches to be measured, portions of OD=1.0 in cyan (C), magenta (M), yellow (Y), and black (B) were used. With regard to black, OD of cyan (Kc), magenta (Km), and yellow (Ky) were measured respectively in order to evaluate color balance.

(Result of Gas Resistance Test)

Differences between the OD survival rates obtained as the results of gas resistance tests for image of Examples 1 to 7 and Comparative Example 1 and the average of the OD survival rates in the images placed at respective locations in homes in the Kanto region and business establishments of Canon Inc. shown in Table 1 obtained by 1 year real environmental test were calculated. The obtained differences were evaluated based on the following references. The results are shown in Table 4.

TABLE 4

Evaluation result

| | Result |
|---|---|
| Example 1 | ○ |
| Example 2 | ○ |
| Example 3 | ○ |
| Example 4 | ⊚ |
| Example 5 | ⊚ |
| Example 6 | Δ |
| Example 7 | Δ |
| Comparative Example 1 | X |

⊚: Differences of OD survival rate in all patches are less than 5%
○: Maximum difference in OD survival rate is not less than 5% and less than 10%
Δ: Maximum difference in OD survival rate is not less than 10% and less than 15%
X: Maximum difference in OD survival rate is not less than 15%

Comparative Example 2

The gas resistance test for image was performed in a similar manner as the Example 1 except that the flow rate in the direction toward the sample surface was changed to 0.1 m. The result was that uneven color fading was caused on the image sample in the mixed gas flow direction in the tank, and thereby the gas resistance test for image could not be performed with accuracy.

(Silver Halide Photo Image Sample)

As the silver halide photo image sample, the same image as one used in the case of the ink-jet image was printed in a common photo print shop (shop dealing with FUJI PHOTO FILM's own articles).

Example 8 and Comparative Example 3

The concentrations of $O_3$, $NO_2$ and $SO_2$ were set to those shown in Table 5, and the resultant gases were used to perform the gas resistance tests for image as Example 8 and Comparative Example 3. The mixed gas was supplied to the image sample surface in the parallel direction with respect thereto at a flow rate of 0.3 m/s by the fan provided in the test tank, and the test was performed with a cycle of 72 hours exposure under the condition of a temperature of 24° C. and humidity of 60%. Note that the unit of the gas amount is ppb in the Table 5.

TABLE 5

Gas concentration condition in exposure test [ppb]

| | $O_3$ | $NO_2$ | $SO_2$ |
|---|---|---|---|
| Example 8 | 150 | 900 | 50 |
| Comparative Example 3 | 150 | — | — |

(Result of Gas Resistance Test)

Differences between the OD survival rates obtained as the results of gas resistance tests for image of Example 8 and Comparative Example 3 and the average of the OD survival rates in the images placed at respective locations in homes in the Kanto region and business establishments of Canon Inc. shown in Table 1 obtained by extrapolating the five year real environmental test based on 1 year real environmental test were calculated. The obtained differences were evaluated based on the following references. The results are shown in Table 6.

TABLE 6

Evaluation result

| | Result |
|---|---|
| Example 8 | ○ |
| Comparative Example 3 | X |

○: Differences of OD survival rate in all patches are less than 5%
X: Maximum differences in OD survival rate is not less than 5%

Example 9 and Comparative Example 4

Ink Set

<Preparation of Color Material>
(Color Material for Yellow Ink)

Aminostilbene-triazole obtained by a known method in which diazotized 4-nitro-4'-aminostilbene-2,2-disulphonic acid was subjected to coupling with 3-aminonaphthalene-1-sulfonic acid and the resultant compound was then triazolated to reduce nitro group to amino group was dissolved in water. Sodium nitrite and hydrochloric acid were dropped into the resultant solution to diazotize it. The resultant solution was dropped into a water solution of the compound represented by the following chemical formula (α) to carry out coupling reaction followed by salting-out by sodium chloride. The resultant compound was then diazotized with an aqueous sodium nitrite solution. Then, 6-aminonaphthalene-2-sulfonic acid aqueous solution was added to the resultant turbid solution and the resultant solution was then triazolated followed by salting-out by sodium chloride. With the above procedure, the color material represented by the chemical formula (1) was obtained.

washing, and was subjected to condensation reaction with cyanuric chloride under the existence of sodium hydroxide. Anthranilic acid was added to the reaction liquid followed by condensation reaction under the existence of sodium hydroxide. The reactant was then filtered and washed to obtain the color material represented by the chemical formula (2).

Chemical formula (β)

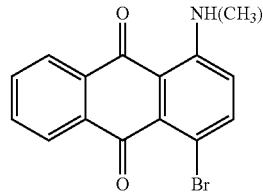

Chemical formula (2)

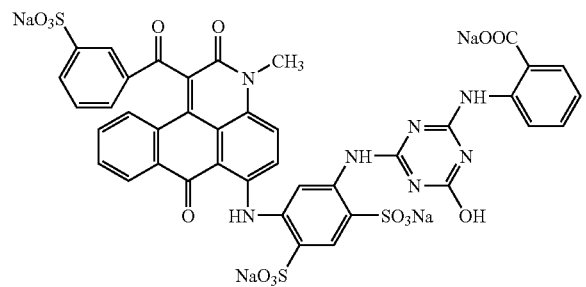

(Color Material for Cyan Ink)

Sulfolane, 4-sulfo-phthalic acid monosodium salt, ammonium chloride, urea, ammonium molybdate, and copper chloride (II) were heated/stirred, washed with methanol followed by addition of water. The mixture was adjusted to pH11 with an aqueous sodium hydroxide solution. An aqueous hydrochloric acid solution was then added to the mixture while stirring, followed by gradual addition of sodium chloride. The Chemical formula (α)

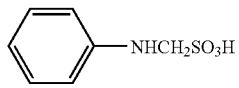

Chemical formula (1)

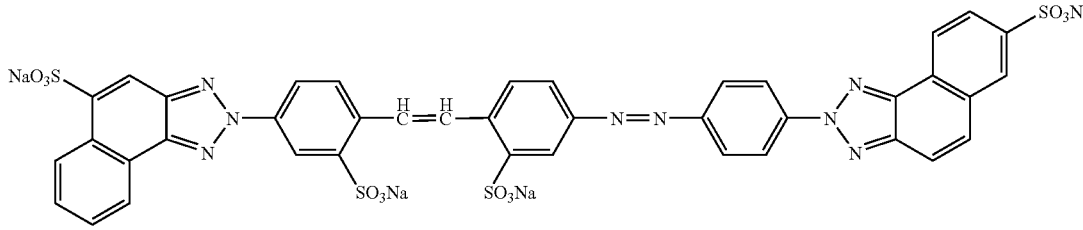

(Color Material for Magenta Ink)

The compound represented by the following chemical formula (β), sodium carbonate and ethyl benzoylacetate ester were reacted in xylene, and the reactant was filtered and washed. The reactant was then sequentially reacted with meta-amino-acetanilide, copper acetate, and sodium carbonate in N,N-dimethylformamide, and the reactant was filtered and washed. Further, the reactant was then subjected to sulfonation in fuming sulfuric acid followed by filtering and deposited crystal was filtered and washed with a 20% aqueous sodium chloride solution, followed by addition of methanol, and the deposited crystal was filtered, washed with a 70% aqueous methanol solution, and dried to obtain desired copper phthalocyanine (tri- or tetra-) sulfonic acid (tri- or tetra-) sodium salt as blue crystal.

Next, copper phthalocyanine (tri- or tetra-) sulfonic acid (tri- or tetra-) sodium salt was gradually fed to chlorosulfonic acid followed by dropping of thionyl chloride to perform reaction. The reaction liquid was cooled and the deposited crystal was filtered to obtain a wet cake of desired copper phthalocyanine (tri- or tetra-) sulfonyl chloride, which was then stirred and suspended followed by addition of aqueous ammonia, and a compound represented by the following chemical formula (γ) to perform reaction. Then, water and sodium chloride were added to the reaction liquid to deposit crystal. The deposited crystal was filtered, washed with an aqueous sodium chloride solution, filtered/washed again, followed by drying to obtain the color material represented by the chemical formula (3).

Chemcial formula (γ)

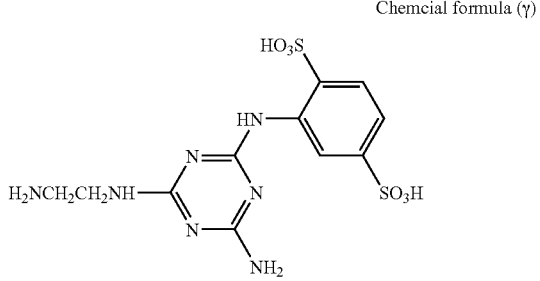

The preparation of the compound represented by the above chemical formula (γ) was performed as follows. LIPAL OH, cyanuric chloride, aniline-2,5-disulfonic acid monosodium salt were fed to ice water followed by addition of an aqueous sodium hydroxide solution and reacted. An aqueous sodium hydroxide solution was subsequently added to the reaction liquid to adjust it to pH10.0. A 28% aqueous ammonia solution and ethylenediamine were fed to the reaction liquid to perform reaction. Subsequently, sodium chloride, concentrated hydrochloric acid were dropped into the reaction liquid to deposit crystal. The deposited crystal was filtered and washed with a 20% aqueous sodium chloride solution to obtain wet cake. Methanol and water were added to the obtained wet cake followed by filtering, washing with methanol, and drying to obtain the compound represented by the above chemical formula (γ).

<Preparation of Ink>

The color materials obtained as described above were used to prepare respective color inks according to the prescription shown in Table 7. After mixing of respective components, each of the mixtures was allowed to pass through a 0.2 μm membrane filter with pressure. The respective color inks obtained as described above were combined to obtain a ink set of Example 9. Each of the compositions described below is represented by part by weight.

TABLE 7

| | Ink composition | | |
|---|---|---|---|
| | Ink | | |
| | Yellow | Magenta | Cyan |
| Color material of formula (1) | 0.5 | — | — |
| C,I, Direct yellow 132 | 2.5 | — | — |
| Color material of formula (2) | — | 5.5 | — |
| Color material of formula (3) | — | — | 5.5 |
| Glycerin | 8.0 | 4.0 | 5.0 |
| Ethylene glycol | — | 13.0 | 12.0 |
| Diethylene glycol | 13.0 | — | — |
| 2-Pyrrolidone | 5.0 | 5.0 | 5.0 |
| 1,5-Pentanediol | — | 5.0 | 5.0 |
| Acetylenol E100 | 0.8 | 0.9 | 0.6 |
| Water | 70.2 | 66.6 | 66.9 |

The ink set of Example 9 was filled into an ink tank for Canon BJC-210J. As Comparative Example 4, a Canon ink cartridge (BC-05) for BJC-210J was prepared.

(Result of Gas Resistance Test)

The respective concentrations of $O_3$, $NO_2$, and $SO_2$ were set to those shown in Table 8, and test results were compared between Example 9 and Comparative Example 4. The mixed gas was supplied to the image sample surface in the parallel direction with respect thereto at a flow rate of 0.3 m/s (an example of the flow rate that does not generate concentration gradient) by the fan provided in the test tank, and the gas Chemical formula (3)

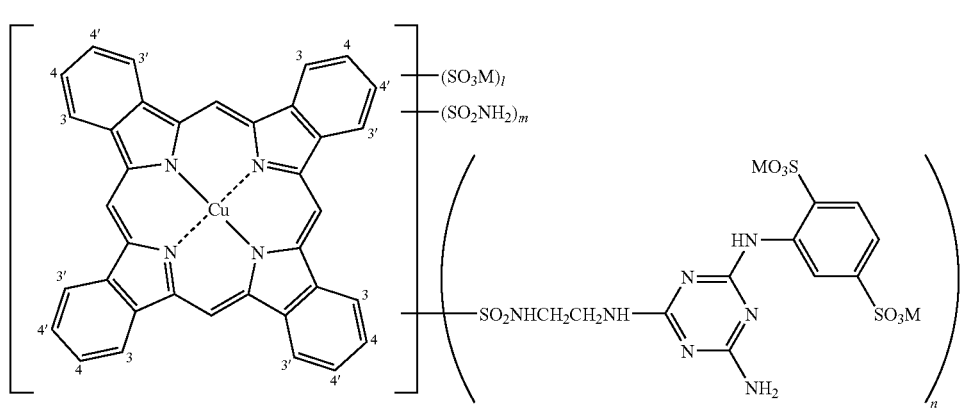

(l=0 to 2, m=1 to 3, n=1 to 3, where l+m+n=3 to 4, m≧1, substitution site of substituent is at 4 or 4')

resistance test for image was performed with five cycles of 72 hours exposure (corresponding to 5 years in the real environment) under the condition of a temperature of 24° C. and humidity of 60%. Note that the unit of the gas amount is ppb in the Table 8.

TABLE 8

Gas concentration condition in exposure test
[ppb]

| | $O_3$ | $NO_2$ | $SO_2$ |
|---|---|---|---|
| Example 9 | 150 | 900 | 50 |
| Comparative Example 4 | 150 | 900 | 50 |

Differences between the OD survival rates obtained as the results of gas resistance tests for image of Example 9 and Comparative Example 4 and the OD survival rates in the image placed at "Home C-Room" shown in the Table 1 that represents the average level of color fading in the real environment test in Kanto region, which had been obtained by extrapolating the five year real environmental test based on 3-year real environmental test were calculated. The obtained differences were evaluated based on the following references. The results are shown in Table 9. Further, the same result was obtained in the case of the evaluation of the differences between the OD survival rates in the image placed at "Home C-Room" shown in the Table 1 that represents the average level of color fading in the real environment test in Kanto region obtained by 5-year real environmental test and the OD survival rates obtained as the results of gas resistance tests for image of Example 9 and Comparative Example 4.

TABLE 9

Evaluation result

| | Result |
|---|---|
| Example 9 | ○ |
| Comparative Example 4 | X |

○: Differences of OD survival rate in all patches are less than 1%
X: Maximum differences in OD survival rate is not less than 1%

The above description has shown how the test method according to the present invention can obtain a result closely similar to one obtained in real environmental test at short times. In the following, FIG. 20 is used to describe that an invention related to ink combination is included in the examination of the test method of the present invention. FIG. 20 shows the OD survival rate of YMC in Example 7. From FIG. 20, it can be seen not only that the respective colors have excellent gas resistance properties, but also that the degrees of color fading in the respective colors correspond to each other well. This means that in the case where the ink set including the above inks is used, the color fading of the secondary or tertiary ink exhibits excellent properties, which allows the color-fading to proceed while the color balance is maintained. The differences of the OD survival rates in all the patches in the images on the same time axis were less than 1%. Therefore, it can be said that the ink set that can form the image in which the differences of the OD survival rates in all the patches on the same time axis (preferably, 5 years, 10 years or more) fall below 1% is a combination of excellent inks. Thus, in the ink set according to the present invention, when the gas resistance test is performed for the images formed by a plurality of inks under the following conditions (1) and (2) for 360 hours in succession, the differences of the OD survival rates in all the patches are less than 1%:

(1) The ozone concentration in the mixed gas is not less than 75 ppb and the nitrogen dioxide concentration in the mixed gas is not less than 150 ppb.

(2) The mixed gas is continuously supplied to the sample surface at a flow rate not less than 0.2 m/s and not more than 3.0 m/s.

The present invention can be used as a more accurate gas resistance test method not only for overall images such as an ink-jet image or silver halide photo, but also for various recording images, and, at the same time, it can be applied to various test methods to be developed. In addition, by applying the above condition, it is possible to use the present invention as a test method defining a common standard in a desired time period, to make the present invention a measurement standard of Japan, and to set the present invention at a global standard.

This application claims priority from Japanese Patent Application No. 2004-349181 filed on Dec. 1, 2004, which is hereby incorporated by reference herein.

The invention claimed is:

1. A gas resistance test method for an image sample, the method comprising:
setting the image sample in a mixed gas atmosphere containing at least ozone and nitrogen dioxide in a test tank; and
evaluating a gas resistance of the image sample under conditions (1) and (2):
(1) ozone concentration in the mixed gas is not less than 75 ppb and not more than 300 ppb, nitrogen dioxide concentration in the mixed gas is not less than 150 ppb and not more than 3000 ppb, and a ratio of ozone to nitrogen dioxide in the mixed gas (ozone:nitrogen dioxide) is from 1:2 to 1:10; and
(2) the mixed gas is continuously supplied to an image sample surface at a flow rate of not less than 0.2 m/s and not more than 3.0 m/s by means of a stifling fan provided in the test tank for stirring the mixed gas.

2. The gas resistance test method according to claim 1, wherein the image sample is set and circulated in a test tank.

3. The gas resistance test method according to claim 1, wherein the mixed gas is obtained by mixing the ozone and the nitrogen dioxide, which have been individually diluted.

4. The gas resistance test method according to claim 1, wherein the image sample is set in a dark room.

5. The gas resistance test method according to claim 1, wherein the mixed gas further contains sulfur dioxide at a concentration of not less than 25 ppb and not more than 3000 ppb.

6. The gas resistance test method according to claim 5, wherein a ratio of the ozone to the nitrogen dioxide to the sulfur dioxide in the mixed gas (ozone:nitrogen dioxide:sulfur dioxide) is 3:19:1.

7. The gas resistance test method according to claim 1, wherein a humidity in a test tank where an image sample is set is 60%.

8. An ink set for ink-jet printing including a combination of a plurality of inks, wherein differences between image concentration survival rates of all the inks are below 1% when images formed of respective said inks are subjected to a gas resistance test for 360 hours in succession under conditions (1) and (2):

(1) ozone concentration in a mixed gas is not less than 75 ppb and nitrogen dioxide concentration in the mixed gas is not less than 150 ppb; and
(2) the mixed gas is continuously supplied to a sample surface at a flow rate of not less than 0.2 m/s and not more than 3.0 m/s.

9. The ink set according to claim 8, wherein the ink set is for a disposable ink cartridge.

* * * * *